United States Patent
Wei et al.

(10) Patent No.: US 11,170,058 B2
(45) Date of Patent: *Nov. 9, 2021

(54) INTERNET OF THINGS STRUCTURED QUERY LANGUAGE QUERY FORMATION

(71) Applicant: SAP SE, Walldorf (DE)

(72) Inventors: Haichao Wei, Santa Clara, CA (US); Priyanka Khaitan, Cupertino, CA (US)

(73) Assignee: SAP SE, Walldorf (DE)

( * ) Notice: Subject to any disclaimer, the term of this patent is extended or adjusted under 35 U.S.C. 154(b) by 37 days.

This patent is subject to a terminal disclaimer.

(21) Appl. No.: 16/721,610

(22) Filed: Dec. 19, 2019

(65) Prior Publication Data

US 2020/0125608 A1    Apr. 23, 2020

Related U.S. Application Data

(63) Continuation of application No. 15/880,350, filed on Jan. 25, 2018, now Pat. No. 10,540,410.

(Continued)

(51) Int. Cl.
*G06F 16/951*    (2019.01)
*G06F 16/22*    (2019.01)
(Continued)

(52) U.S. Cl.
CPC .......... *G06F 16/951* (2019.01); *G06F 16/164* (2019.01); *G06F 16/2282* (2019.01);
(Continued)

(58) Field of Classification Search
CPC .. G06F 16/951; G06F 16/2468; G06F 16/164; G06F 16/2433; G06F 16/2282; G06F 16/24578; G06F 16/248
(Continued)

(56) References Cited

U.S. PATENT DOCUMENTS 7,047,226 B2 * 5/2006 Rubin .................... G06N 5/025
706/47
7,181,438 B1    2/2007 Szabo
(Continued)

OTHER PUBLICATIONS

"U.S. Appl. No. 15/880,304, Non Final Office Action dated Nov. 25, 2019", 13 pgs.
(Continued)

*Primary Examiner* — Dung K Chau
(74) *Attorney, Agent, or Firm* — Schwegman Lundberg & Woessner, P.A.

(57) ABSTRACT

In an example, one or more tokens in a freeform search query are identified, each token corresponding to a search term or combination of neighboring search terms in the freeform search query. A graph structure and flat data corresponding to the graph structure are obtained. A search for results relevant to the identified one or more tokens is performed using a first search process, the first search process using the graph structure and flat data to rank search results according to a first ranking order and populate a why found table. Pieces of data corresponding to the results relevant to the identified one or more tokens are joined using the why found table, forming a view and one or more patterns of operators and terms, in a pattern database, matching the one or more operators and one or more surrounding terms in the freeform search query are found.

20 Claims, 17 Drawing Sheets

Related U.S. Application Data

(60) Provisional application No. 62/586,287, filed on Nov. 15, 2017.

(51) Int. Cl.

| | | |
|---|---|---|
| *G06F 16/242* | (2019.01) | |
| *G06F 16/2457* | (2019.01) | |
| *G06F 16/2452* | (2019.01) | |
| *G06F 16/25* | (2019.01) | |
| *G06F 16/2458* | (2019.01) | |
| *G06F 16/16* | (2019.01) | |
| *G06F 16/248* | (2019.01) | |
| *H04W 4/70* | (2018.01) | |

(52) U.S. Cl.
CPC ........ *G06F 16/248* (2019.01); *G06F 16/2433* (2019.01); *G06F 16/2468* (2019.01); *G06F 16/24522* (2019.01); *G06F 16/24578* (2019.01); *G06F 16/252* (2019.01); *G06F 16/258* (2019.01); *G06F 16/2465* (2019.01); *H04W 4/70* (2018.02)

(58) Field of Classification Search
USPC .......................................................... 707/706
See application file for complete search history.

(56) References Cited

U.S. PATENT DOCUMENTS

| | | | |
|---|---|---|---|
| 7,877,407 | B2 | 1/2011 | Smith, III |
| 8,037,010 | B2 | 10/2011 | Jaros et al. |
| 8,099,491 | B2 | 1/2012 | Error |
| 8,209,274 | B1 | 6/2012 | Mann et al. |
| 8,265,778 | B2 | 9/2012 | Taylor et al. |
| 8,429,106 | B2 | 4/2013 | Downs et al. |
| 8,572,075 | B1 | 10/2013 | Zatsman et al. |
| 8,892,484 | B2 | 11/2014 | Sipple |
| 9,201,927 | B1 | 12/2015 | Zhang |
| 9,256,761 | B1 | 2/2016 | Sahu et al. |
| 9,787,838 | B1 | 10/2017 | Lembersky et al. |
| 9,836,461 | B1 | 12/2017 | Mishne et al. |
| 9,904,962 | B1 | 2/2018 | Bastide et al. |
| 10,540,410 | B2 | 1/2020 | Wei et al. |
| 10,642,908 | B2 | 5/2020 | Wei |
| 10,713,310 | B2 | 7/2020 | Wei et al. |
| 10,726,072 | B2 | 7/2020 | Wei et al. |
| 2003/0014331 | A1* | 1/2003 | Simons .................. G06Q 30/02 705/26.62 |
| 2005/0144158 | A1 | 6/2005 | Capper et al. |
| 2009/0012842 | A1* | 1/2009 | Srinivasan .............. G06F 40/30 705/12 |
| 2010/0153324 | A1 | 6/2010 | Downs et al. |
| 2011/0307897 | A1 | 12/2011 | Atterbury et al. |
| 2012/0137367 | A1* | 5/2012 | Dupont ................... G06F 21/00 726/25 |
| 2012/0191684 | A1 | 7/2012 | Epstein |
| 2014/0181192 | A1 | 6/2014 | Sankar et al. |
| 2015/0169589 | A1 | 6/2015 | Lopiano |
| 2015/0293946 | A1 | 10/2015 | Fong et al. |
| 2016/0125751 | A1 | 5/2016 | Barker et al. |
| 2016/0239502 | A1* | 8/2016 | Alonso ............. G06Q 30/0261 |
| 2016/0306846 | A1 | 10/2016 | Adams, Jr. et al. |
| 2016/0314122 | A1 | 10/2016 | Platakis et al. |
| 2017/0075877 | A1 | 3/2017 | Lepeltier |
| 2017/0003161 | A1 | 11/2017 | Li |
| 2017/0316100 | A1* | 11/2017 | Li ....................... G06F 16/9535 |
| 2018/0032930 | A1 | 2/2018 | Kolb et al. |
| 2018/0113866 | A1 | 4/2018 | Bendersky et al. |
| 2018/0121550 | A1* | 5/2018 | Jeon ........................ G06Q 50/01 |
| 2019/0147090 | A1 | 5/2019 | Wei et al. |
| 2019/0147091 | A1 | 5/2019 | Wei et al. |
| 2019/0147107 | A1 | 5/2019 | Wei et al. |
| 2019/0147110 | A1 | 5/2019 | Wei et al. |

OTHER PUBLICATIONS

"U.S. Appl. No. 15/880,304, Preliminary Amendment filed Feb. 8, 2018", 8 pgs.

"U.S. Appl. No. 15/880,335, Non Final Office Action dated Oct. 4, 2019", 6 pgs.

"U.S. Appl. No. 15/880,335, Response filed Dec. 10, 2019 to Non Final Office Action dated Oct. 4, 2019", 9 pgs.

"U.S. Appl. No. 15/880,350, Notice of Allowance dated Oct. 3, 2019", 12 pgs.

"U.S. Appl. No. 15/880,276, Notice of Allowance dated Mar. 24, 2020", 9 pgs.

"U.S. Appl. No. 15/880,304, Notice of Allowance dated Mar. 11, 2020", 10 pgs.

"U.S. Appl. No. 15/880,304, Response filed Jan. 17, 2020 to Non Final Office Action dated Nov. 25, 2019", 11 pgs.

"U.S. Appl. No. 15/880,335, Notice of Allowance dated Dec. 30, 2019", 9 pgs.

\* cited by examiner

INTERNET OF THINGS STRUCTURED QUERY LANGUAGE QUERY FORMATION

CROSS-RELATION TO RELATED APPLICATIONS

This application is a continuation of prior application Ser. No. 15/880,350, filed Jan. 25, 2018, and claims priority to U.S. Provisional Application No. 62/586,287, filed Nov. 15, 2017, entitled "INTERNET OF THINGS SEARCH AND DISCOVERY." All applications are incorporated herein by reference in their entirety.

TECHNICAL FIELD

This document generally relates to systems and methods for Internet of Things (IoT) data management. More specifically, this document relates to structured query language formation for IoT data.

BACKGROUND

The IoT is a network of physical devices, vehicles, and other items embedded with electronics, software, sensors, actuators and/or network connectivity, which enables these objects to collect and exchange data. "Things" refers to any sort of object that can product and exchange information. Common examples are home appliances, business and manufacturing equipment, wearable devices, and the like. It is expected that the number and type of things that can be connected via the IoT will increase exponentially in the next decade.

The result of this rapid expansion of IoT is a technical difficulty in managing the data produced by the things in an IoT network. Sensor data, for example, can be gathered multiple times per second on just a single device, leading to a significant amount of data to maintain and sort even for a single device, let alone the millions or billions expected to be IoT-capable in the coming years.

There are also many different types of data that are relevant in an IoT network. Sensor data is only one of these types of data, but the data could also include, for example, equipment identifications, model information, model instances, etc. Focusing indexing and searching of IoT data on individual types of data may be too limiting because users may not know the type of data they are looking for. For example, a user may be interested in obtaining a manual for a piece of equipment, and they may know the manufacturer but not the model name, and yet the manual may be stored only in a model instance identified by the model name. Searching on manufacturer data only will not find a manual because the manual is not stored in the manufacturer data, but searching on model instances alone will not find the manual because the manufacturer name is not found in the model instance data. What is needed are mechanisms allowing for indexing and searching across data types in an IoT network.

BRIEF DESCRIPTION OF DRAWINGS

The present disclosure is illustrated by way of example and not limitation in the figures of the accompanying drawings, in which like references indicate similar elements.

FIG. 9 is a screen capture illustrating a user interface for search queries and results in accordance with an example embodiment.

FIG. 10 is a screen capture illustrating another search entered into the user interface for search queries and results in accordance with an example embodiment.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, a search engine that is capable of simultaneously and efficiently searching and retrieving multiple types of data in an IoT network is provided. The search engine allows for handling of freeform queries to return more relevant results than prior search engines, from data such as master data, sensor data, and metadata. Additionally, the search engine capabilities can be extended to other types of activities on the IoT data, including deletion, creation, and update, all within a single interface. Furthermore, the search engine capabilities are contextual, conversational, and analytical.

Figure 1:
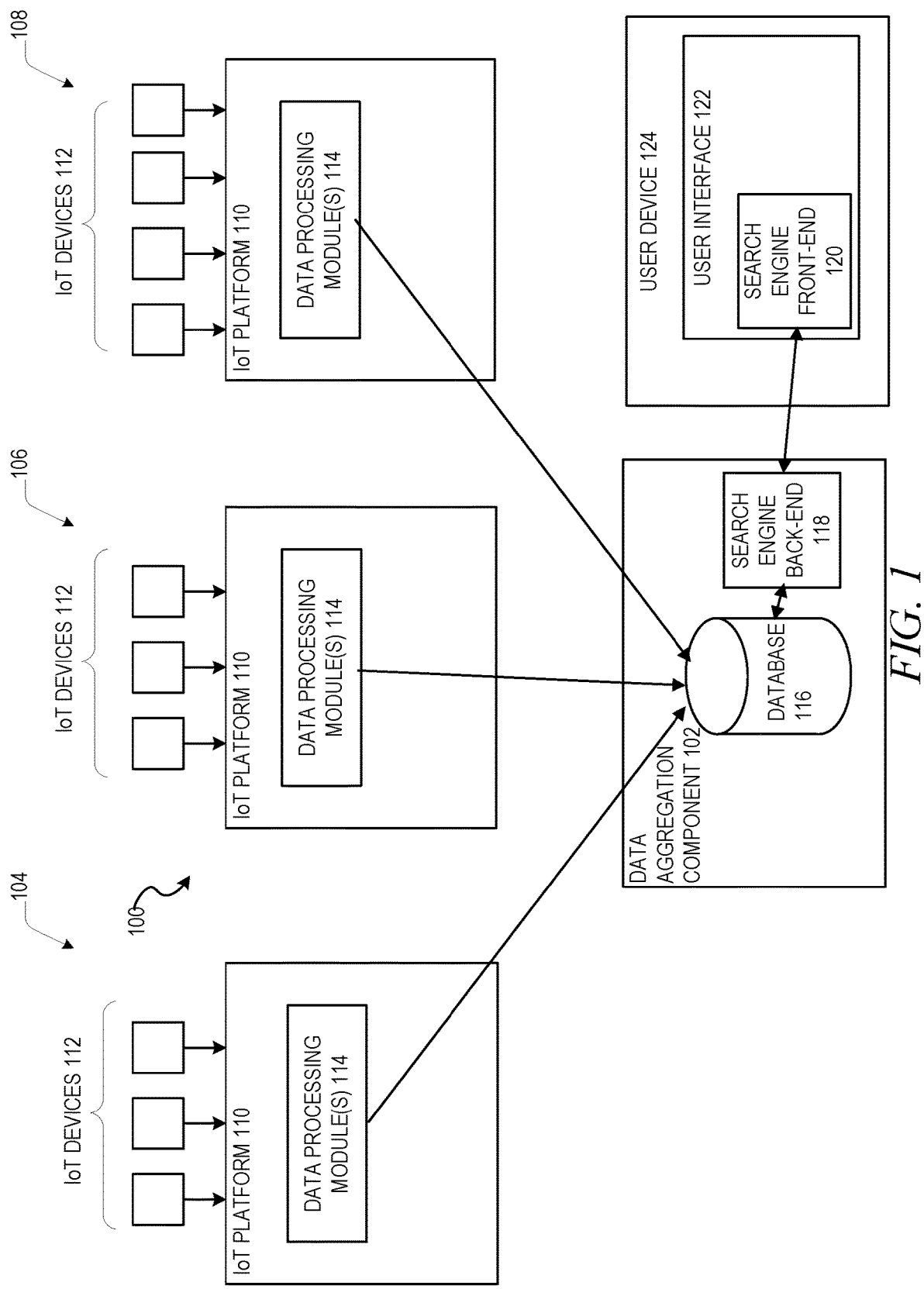
FIG. 1 is a block diagram illustrating a system for IoT data management in accordance with an example embodiment.

FIG. 1 is a block diagram illustrating a system 100 for IoT data management in accordance with an example embodiment. Here, the system 100 may include a data aggregation component 102 that aggregates data from a plurality of IoT networks 104, 106, 108. Each IoT network 104, 106, 108 may be operated by a different customer of the system 100. Each IoT network 104, 106, 108 comprises an IoT platform 110 and a plurality of IoT devices 112. Each IoT network 104, 106, 108 may also include a data processing module 114 that collects information from the IoT devices 112 (as well as other data related to the IoT devices 112). Examples of data processing modules 114 may include streaming data collectors such as event stream processing (ESP) applications and relational database collectors such as SQL Anywhere Connector™ from SAP, SE of Walldorf, Germany.

Data gathered by the data aggregation component 102 may be stored in a database 116. In some example embodiments, the database 116 may be an in-memory database, such as HANA™ from SAP, SE of Walldorf, Germany.

A search engine back end 118 obtains data from the database 116 in response to queries received by a search engine front-end 120 in a user interface 122 on user device 124. In some example embodiments, the user interface 122 may be a web browser and the search engine front-end 120 may be a web page executing in the web browser. In other example embodiments, the user interface 122 may be part of a stand-alone application on user device 124.

One technical challenge that is encountered with providing efficient and reliable search results in an IoT network is how to handle the plethora of different types of data that are encountered. Another technical challenge is the sheer volume of data, especially from such data types as sensor data. There may be many different types of sensors, some of which may be capable of continuous data collection (for example, temperature sensors, which can be capturing temperature readings at any number of intervals specified by a user).

In some example embodiments, the sensor data, as well as other IoT-related data, may be initially indexed into a flat data store as flat data. This flat data is then augmented with metadata and the metadata. This metadata may then be used to identify linkages between pieces of data and these linkages can then be used to create a graph structure. As will be seen in more detail later, the graph structure allows data from various types of IoT sources to be stored efficiently while permitting freeform searches on the data to be efficient as well.

Figure 2:
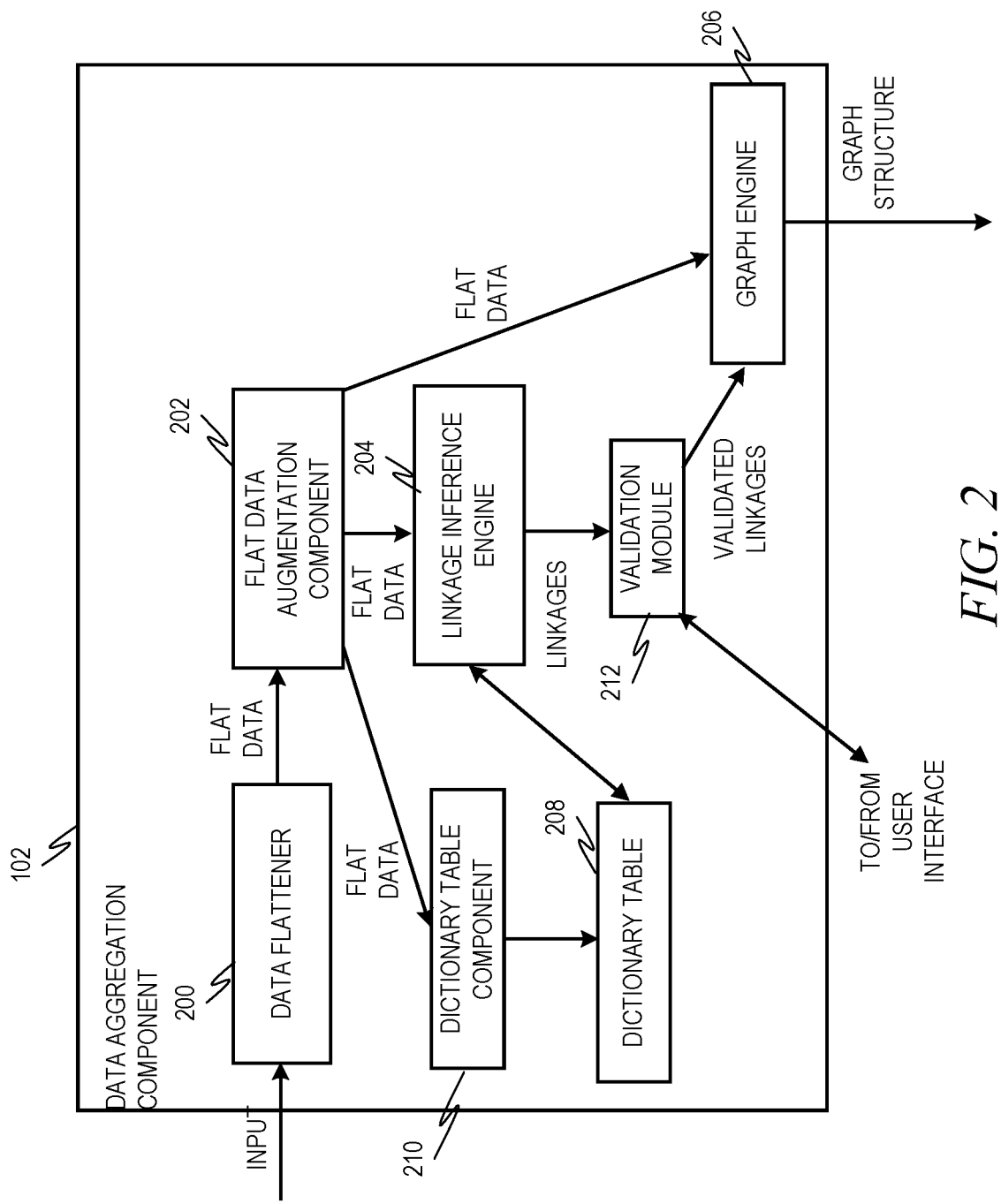
FIG. 2 is a block diagram illustrating the data aggregation component of FIG. 1 in more detail, in accordance with an example embodiment.

FIG. 2 is a block diagram illustrating the data aggregation component 102 of FIG. 1 in more detail, in accordance with an example embodiment. In an example embodiment, the IoT data is initially stored in a relational database as a plurality of relational tables. In order to create the indexed flat data, these relational tables need to be flattened. As such, a data flattener 200 may be provided to perform this flattening aspect. In an example embodiment, the relational tables are flattened by identifying unique paths through the relational tables and retrieving data from the tables in each path to form a record. It should be noted that relational tables are only one example of a format of database file that may be flattened. In practice, any type of database format may be flattened through various techniques that are beyond the scope of this disclosure.

The record for each path may then be augmented with metadata by a flat data augmentation component 202. This metadata may include a type name for the data in the record and an attribute name for each attribute of the record. The metadata may then be used to identify linkages between records.

While in a perfect world each underlying piece of data would explicitly identify each other related piece of data in the flat data (which would allow the graph structure to be constructed by creating edges for each of these explicit relations), in the IoT world it is rare if not unheard of for such identifications to be made explicitly. For one thing, most IoT equipment is simply not set up to track data type interactions in this way. For example, a piece of equipment may have an ability to mark the locations where the equipment resides, but it has no way to know that there is a location data type for each of these locations that itself might have its own attributes. As such, in an example embodiment, a linkage inference engine 204 is used to make inferences as to relationships between nodes.

The linkage inference engine 204 operates by scanning attributes of various pieces of data in the flat data store and identifying pieces of data that contain subsets of attributes of one another. Any piece of data that contains a subset of attributes of any other piece of data can be considered as having a potential linkage to that other piece of data.

In many Enterprise Resource Planning (ERP) systems, each ID assigned to an attribute is globally unique. This is known as a "Globally Unique Identifier" (GUID). Thus, the same ID is not repeated twice (e.g., if "1" is assigned to a particular location, then "1" will not be assigned to any other locations and also will not be assigned to any other type of ID, such as user ID, equipment ID, etc., in the system).

In some example embodiments, GUIDs may be assigned when the original data, such as relational data, is flattened into flat data format. For example, as described above, relational tables may be flattened by identifying unique paths through the relational tables. Each of these unique paths may be assigned a GUID.

The linkage inference engine 204 can also infer the types of individual pieces of data. For example, it can infer that the number 10 is a measurement and the string "Jul. 15, 2015" is a date. This interference is based on the data itself and corresponding relationships with other pieces of data in the flat data. Thus, this inference may be "customer-centric" in that the inference (and the inference's subsequent acceptance by the customer) may vary from customer to customer.

The inferred linkages between pieces of flat data can then be used by a graph engine 206 to generate a graph structure. The graph structure contains nodes corresponding to pieces of flat data and edges corresponding to the linkages. This will be described in more detail below.

Figure 3:
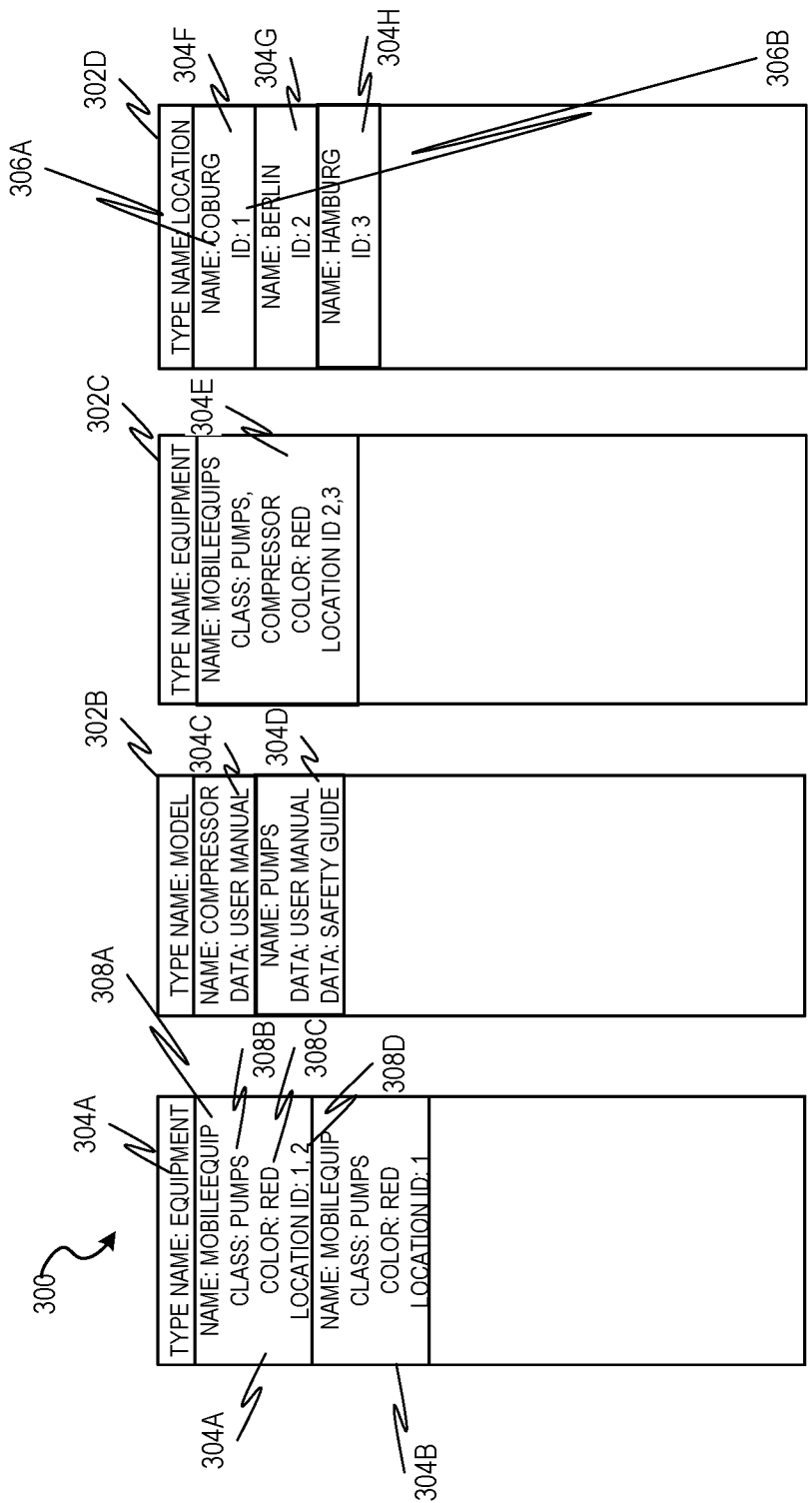
FIG. 3 is a diagram illustrating flat data stored in a flat data store.

FIG. 3 is a diagram illustrating flat data 300 stored in a flat data store. When data is indexed in the flat data store, each piece of data may be stored in a record 302A-302D. Each record may have one or more pieces of data, and it is not necessary that each type of data only have a single record. Here, for example, record 302A contains data of the Equipment data type, and it contains two pieces of data 304A, 304B of that Equipment data type. Likewise, record 302B contains two pieces of data 304C, 304D of the Model data type. Record 302C contains a single piece of data 304E of the Equipment data type. Record 302D contains three pieces of data 304F, 304G, 304H of the Location data type. It should be noted that while the pieces of data 304A-304H are depicted in this figure as text, in many example embodiments the pieces of data 304A-304H may be stored as tables, with each column in the table corresponding to a different attribute type and each row in the table corresponding to a different instance of information. Thus, for example, piece of data 304A may be stored as a table with columns "name", "class", "color" and "location ID", and there may be two rows, one corresponding to "MobileEquip" "Pumps" "Red" "1" and one corresponding to MobileEquip" "Pumps" "Red" "2."

Since there are many different potential types of data that may be stored in the flat data store, there are a large number of different potential attributes for the data. Indeed, the flexibility to create attributes is so great that it is common for attributes of different types of data to actually be the same attribute but be named or formatted in a such a way that does not make explicit that the attribute is the same. For example, in FIG. 3, record 302D has piece of data 304F, which corresponds to the location "Coburg." It has attributes such as "Name" 306A (Coburg) and "ID" 306B (1). Record 302A has piece of data 304A, which corresponds to the equipment brand "MobileEquip" and has attributes such as "Name" 308A (MobileEquip), "Class" 308B (Pumps), "Color" attribute 308C (Red) and "Location ID" attribute 308D (1 and 2). Notably, the Location ID attribute 308D for location 1 corresponds to the same data as, for example, the ID attribute 310A of piece of data 304F in record 302D, and yet they are named differently. There is nothing in the data explicitly linking Location ID attribute 308D of piece of data 304A to the Location ID attribute 308D of piece of data 304F.

As such, in an example embodiment, the linkage inference engine 204 scans the attributes of the various pieces of data to locate attributes that contain values that are a subset of the value of other attributes.

Identifying the linkage in systems where the IDs are not unique is more challenging. In some example embodiments, the linkage inference engine 204 may further improve the proposed linkages between attributes in such cases by examining the names of the attributes and seeing if there are attributes sharing the names, prior to looking for matching subsets of values of attributes. For example, the linkage inference engine 204 may first notice that the attribute name "location ID" of piece of data 304A contains one part ("location") that is a value of the data type attribute 308D of piece of data 304F. This is a strong indicator that piece of data 304F may contain a linkage and thus it may then look to identify, in record 302A, subsets of values from attributes of record 302D, as described above.

Matching of the subsets may be performed in a number of different ways. In an example embodiment, a subset is defined in the linkage inference engine 204 as a first set of values of attributes in a first record, where all of the values in the first set are contained within a second set of values of attributes from a different record. The linkage inference engine 204 then compares all potential sets in the flat data store in order to identify these subsets.

It should be noted that in some environments where the number of potential sets is quite large, the above process may be very time- and processor-intensive. As such, in an example embodiment, a modification is provided using a dictionary table 208. When each record 202A-202D and all its attributes are indexed, the attributes are put in the dictionary table 208 by a dictionary table component 210. The dictionary table 208 is based on hashed values by hashing each of the attribute identifications and values after they have been sorted. The dictionary table 208 is designed in a way such that all the sorted unique IDs are hashed, and these IDs are linked to their sources in the flat data. The dictionary table 208 is indexed by the data type and the attribute names. When the linkage process is initiated, it may then be performed on the dictionary table 208 instead of the flat data itself. So, for example, the dictionary table 208 may have a first column for a data type such as equipment, a second column for an attribute name such as location ID, and a third column for the actual values of the attribute, which are unique and sorted and have a hash code.

Once the linkage inference engine 204 completes its inferences, one or more of these inferences may be presented to a customer for validation by a validation module 212. Thus, for example, the customer may be presented with the inference that Coburg is a location that matches one of the locations of the equipment MobileEquip. If the customer validates this linkage, such as by saying "yes" to a question posed as to whether the linkage is valid, then the linkage may be used when creating the graph structure.

The graph structure may then be formed by the graph engine 206 by creating a node for each instance of a piece of data, with each node having a type associated with the data type of the underlying data. Linked pieces of data can be represented by edges between nodes. As described above, each piece of data may in actuality be a record that could contain multiple rows, one for each instance. As such, the creation of the graph structure may include creating a node for each row of each piece of data in the flat data.

Figure 4:
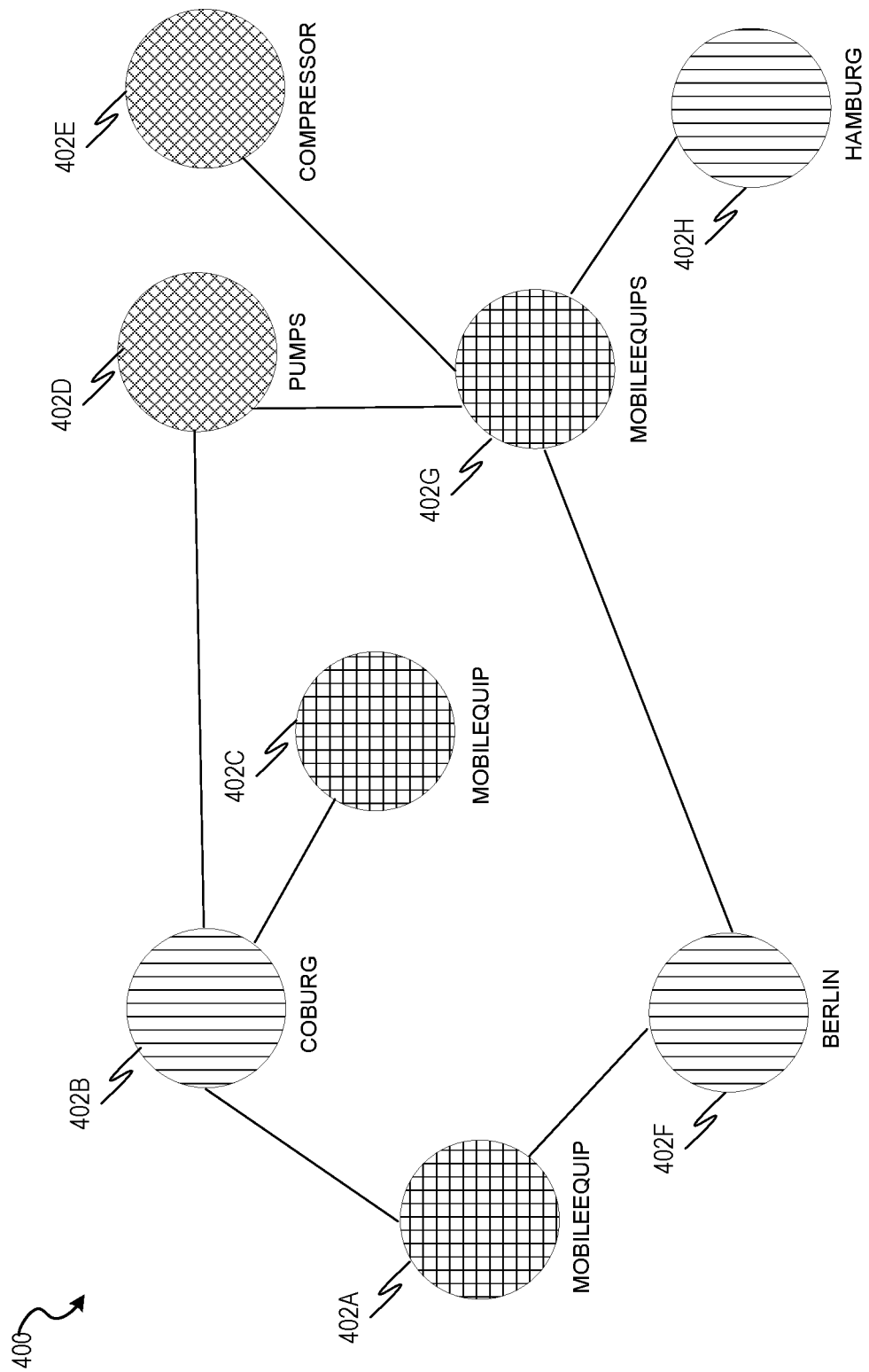
FIG. 4 is a block diagram illustrating an example of a graph structure in accordance with an example embodiment.

FIG. 4 is a block diagram illustrating an example of a graph structure 400 in accordance with an example embodiment. Each piece of data, whether it be sensor data, master data, or metadata, is stored as a node, such as nodes 402A-402H. Each node 402A-402H may contain an identification of the underlying data. In some example embodiments, each node 402A-402H contains the data itself, but in some example embodiments, each node 402A-402G identifies the data that is stored in the flat data store, without actually storing the underlying data.

Each node 402A-402H may have a data type. Here, the different data types are identified by different colors depicted for the nodes of the different data types, but at the database level the different nodes may each contain a data type attribute that identifies the data type of the underlying node. Here, for example, there are nodes having a sensor data type, an equipment data type, a location data type, and a model data type.

Each node 402A-402H may be linked to any other node 402A-402H via an edge, such as edges 404A-404H. An edge 404A-404H exists between two nodes when there is a linkage between the underlying pieces of data.

Figure 5:
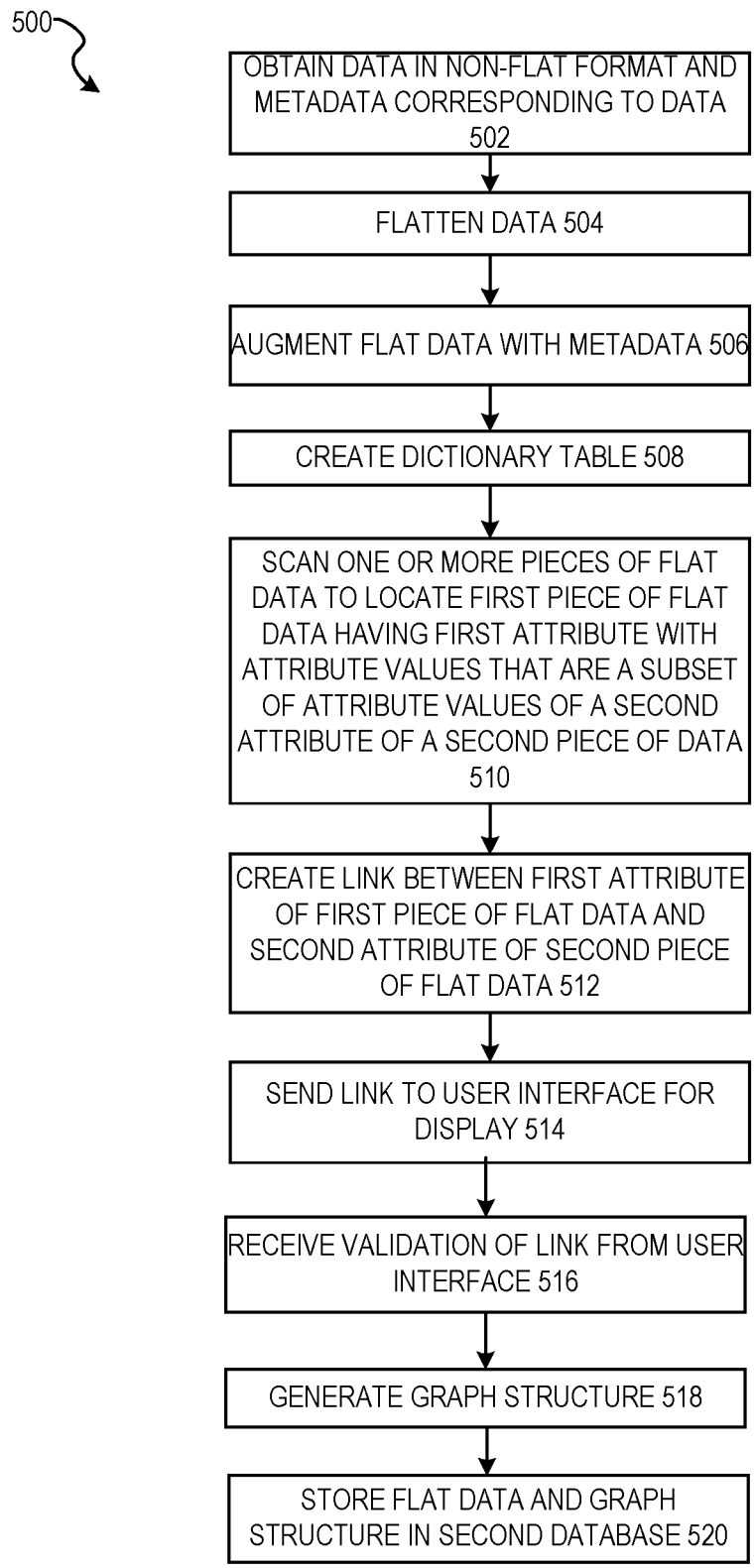
FIG. 5 is a flow diagram illustrating a method for indexing data in accordance with an example embodiment.

FIG. 5 is a flow diagram illustrating a method 500 for indexing data in accordance with an example embodiment. At operation 502, data in a non-flat format, and metadata corresponding to the data, are obtained from a first database. At operation 504, the data is flattened into flat data. At operation 506, the flat data is augmented with the metadata. The metadata includes attribute names and values for attributes corresponding to the attribute names. At operation 508, a dictionary table is created with data types on one axis and attribute names on another axis, with table entries having hashed values for corresponding combinations of data types and attribute names.

At operation 510, one or more pieces of the flat data are scanned to locate a first piece of flat data having a first attribute with attribute values that are a subset of attribute values of a second attribute of a second piece of flat data. At operation 512, a link is created between the first attribute of the first piece of flat data and the second attribute of the second piece of flat data. At operation 514, the link between the first attribute of the first piece of flat data and the second attribute of the second piece of flat data is sent to a user interface on a user device for display. At operation 516, a validation of the link is received from the user interface. At operation 518, a graph structure is generated. The graph structure contains a plurality of nodes, each node corresponding to a data type of the flat data and corresponding to one or more pieces of data in the flat data of the corresponding data type, the graph structure further containing a plurality of edges connecting one or more of the plurality of nodes, each edge corresponding to a link between an attribute of a node at one side of the edge and an attribute of a node at another side of the edge. At operation 520, the flat data and the graph structure are stored in a second database.

Figure 6:
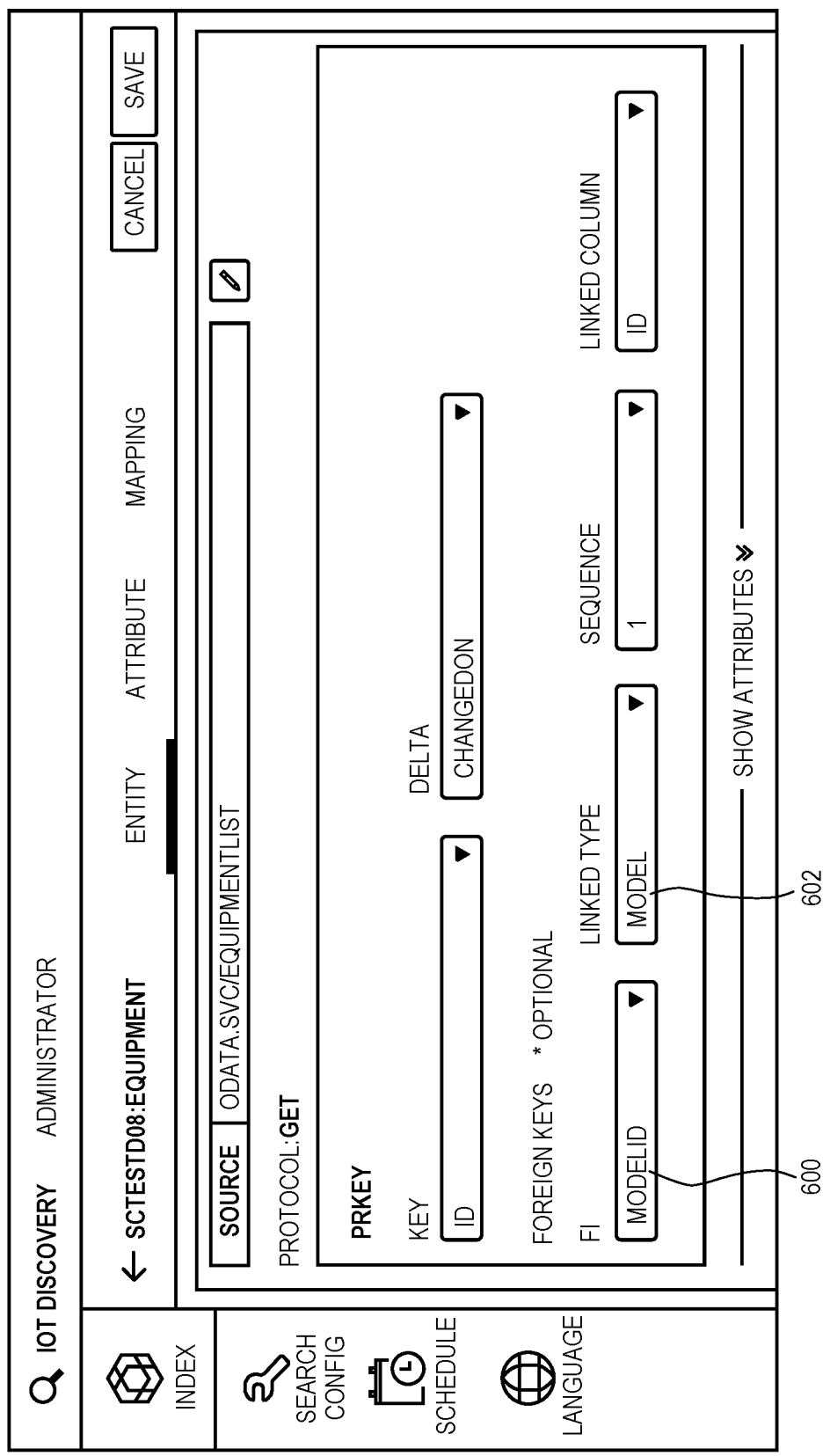
FIG. 6 is a screen capture illustrating a user interface for validation of linkages between pieces of flat data in accordance with an example embodiment.

FIG. 6 is a screen capture illustrating a user interface for validation of linkages between pieces of flat data in accordance with an example embodiment. As indicated earlier, the validation module 212 may ask one or more users to validate linkages proposed by the linkage interface engine 214. This may be accomplished by sending proposed linkages to user interface 122 on user device 124 (FIG. 1). It should be noted that it is not necessary that the same user device 124 be used for this validation as will subsequently be used to obtain search queries and display search results.

In FIG. 6, there is an indication of a matched attribute 600 and an indication of the proposed linked type 602, in the form of a drop-down menu that the user can alter to change the linkage or delete the linkage.

Once the graph structure 400 has been formed, it may then be stored in the database 116 along with the flat data 300. In an example embodiment, both the flat data 300 and the graph structure 400 are used to perform freeform searches on data. Specifically, one of the technical issues associated with the variety of different IoT data types that can be stored is that users may find it difficult to identify relevant data, especially when not knowing exactly what to search for. For example, a user may wish to locate a user manual for a particular piece of equipment, but the user may be the user of the exact model number of the equipment. The user manual may be stored in a "model" data type, but the user may only know the brand (e.g., MobileEquip) and general type (e.g., pumps) of the equipment. A search on either MobileEquip or pump on either the flat data 300 or the original relational database will produce results, but none of those results will actually contain the user manual sought. Additional issues that may occur are misspellings or synonyms in the indexed data that are not found in the search query, or vice versa. What is needed is a technical solution that allows for freeform searching to be performed in an efficient and effective manner.

Referring back to FIG. 1, the search engine front-end 120 may obtain, via the user interface 122 on user device 124, a search query, from a user of the user device 124. In one example embodiment, this may be performed by presenting a text box in the user interface 122 where the user can type the search query. The search engine front-end may then forward the search query to the search engine back-end 118.

Figure 7:
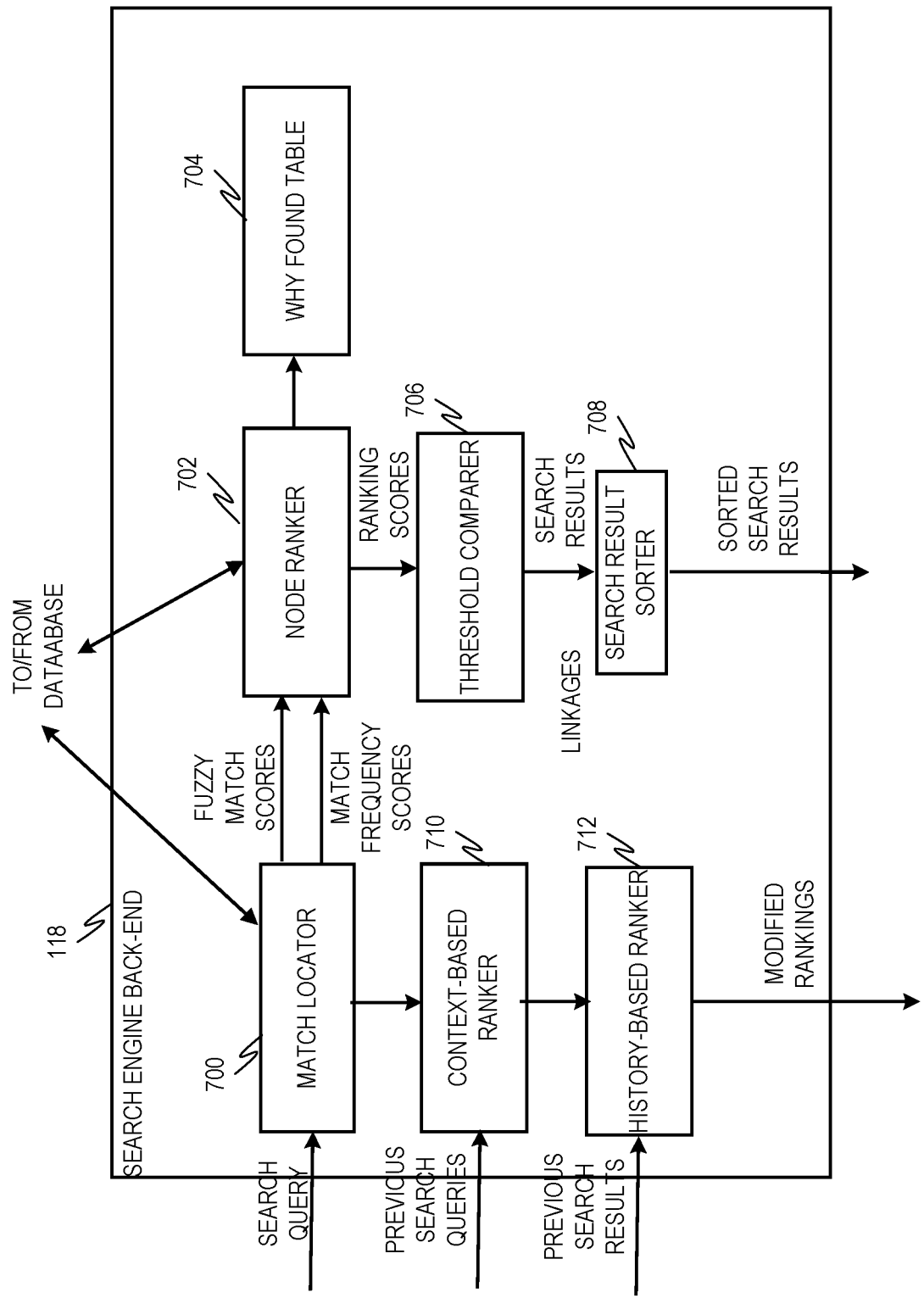
FIG. 7 is a block diagram illustrating a search engine back-end in more detail, in accordance with an example embodiment.

FIG. 7 is a block diagram illustrating a search engine back-end 118 in more detail, in accordance with an example embodiment. The search engine back-end 118 may include a match locator 700. In an example embodiment, the match locator 700 first searches the flat data 300 (or alternatively the dictionary table 208) to identify matches to terms in the underlying data. The matches may appear in any of the attributes of the flat data 300.

It should be noted that in some example embodiments, the flat data 300 contains the aforementioned augmented metadata. It should also be noted that these matches need not be exact. Rather, a fuzzy match score may be assigned to each attribute, and if the fuzzy match score exceeds a predetermined threshold, then the piece of data having the attribute may be considered a match. Thus, for example, if the search contained the term "MobileEquip," then a piece of data having an attribute "name" of "MobileEquip" would be an exact match, but a piece of data having an attribute "name" of "MobileEquip" may also be considered a match, albeit with a lower fuzzy match score. A piece of data having an attribute "name" of "MobileEquips" may also be considered a match with a lower fuzzy match score, but a piece of data having an attribute "name" of "Mob" may be considered to be too far from the exact match to be considered a match, due to having a fuzzy match score below a predetermined threshold.

In some example embodiments, the piece of data having an attribute "name" of "Mob" may be assigned a fuzzy match score and then that fuzzy match score determined not to meet a threshold score. In one example embodiments, the matching algorithm is advanced enough to know that the name "Mob" is simply too far from the query term "MobileEquip" and thus no fuzzy match score need to be assigned. In such cases the fuzzy match score may only be calculated for pieces of data that are somewhat close to the original search term in the query.

Dictionaries and synonyms could also be used at this point to help identify alternative spellings of terms and synonyms of words that should be considered identical.

Nevertheless, the result of these operations is that matching pieces of data (those that have fuzzy match scores exceeding a first threshold) will be assigned their respective fuzzy match scores, but non-matching pieces of data will be assigned a fuzzy match score of 0. In some example embodiments, these fuzzy match scores may be based on edit distance, and the threshold may indicate a threshold edit distance.

There may be cases where multiple attributes of the piece of data match search terms. For example, if the search query was "Equipment MobileEquip in Coburg," then a piece of data having a data type attribute of "Equipment" and a name attribute of "MobileEquip" would match on both of these attributes. In such cases, each match can be assigned its own fuzzy match score, and the fact that multiple matches were found could enhance the ranking of the piece of data in the results, as will be seen below.

Specifically, a match frequency score can also be assigned to each piece of data that has a match. The match frequency score represents or is proportional to the number of matching attributes in the piece of data. Thus, for example, the piece of data having a data type attribute of "Equipment" and a name attribute of "MobileEquip" might have a match frequency score of 2 whereas a piece of data having the data type attribute of "Location" and a name attribute of "Coburg" might have a match frequency score of 1. This provides relevance to the user typing in aspects of the desired results that aren't necessarily the aspects of the data value itself. Specifically, for example, since the user specified the term "Equipment" in the query, the "MobileEquip" piece of data will wind up being ranked higher than the "Coburg" piece of data, unlike the case where the user simply provided the query "MobileEquip in Coburg," in which case they would be tied. For pieces of data having only a single matching attribute, those pieces of data may be assigned a match frequency score of 0.

Then, for every node in the graph, a ranking score may then be calculated. The ranking score is based on the fuzzy match score and match frequency score for each node (which will both be 0 for non-matching nodes) and also based on the fuzzy match score and match frequency score for every matching node in the graph, scaled by the distance between the node and the corresponding matching node along the shortest path through the graph. In some example embodiments, a scaling factor such as a square root may be applied to the distance. As such, matching nodes that are close to the node have more weight towards the node's score than matching nodes that are further away, along the shortest path.

The reason the shortest path is used is that the graph can be cyclical, and thus there can be multiple paths from one node to another node in the graph.

An example will be presented in the context of the flat data 300 of FIG. 3 and the graph structure 400 of FIG. 4. If the search query is Equipment MobileEquip in Coburg, then matches include Equipment nodes 402A, 402C, and 402G and Location node 402B. Each of these matches is assigned a fuzzy match score. Here, for example, the fuzzy match score for node 402A would be higher than that for either node 402C or 402G because it more exactly matches the spelling in the query. For each of these matching nodes 402A, 402B 402C, 402G, a match frequency score is assigned if the node matches for multiple possible matching attributes. Here, for example, nodes 402A, 402C, and 402G all would be assigned match frequency scores because they match based both on the term "equipment," which matches the attribute "type name," and on their names, which match, at least closely enough, the term "MobileEquip."

In some example embodiments, at this stage another table called a "why found" table 704 can also be populated. The why found table 704 stores, for each node, the reasons why the node has been matched. At this stage, for example, node 402B has been matched solely due to its location name attribute matching a term in the search query. As such, the why found table 704 may store "location name attribute" as the "why found" for the Coburg node 402B. Likewise, each of nodes 402A, 402C and 402G are matched for multiple reasons, firstly because they match on their types (equipment) and secondly because they match on their names. Thus, type and name may both be added to the why found table 704 entry for each of nodes 402A, 402C, and 402G. The use of the why found table 704 will be described in more detail later.

Then a ranking score is assigned to every node 402A-402H. For each of these nodes 402A-402H, the tanking score is based on the combination of fuzzy match score and match frequency scores for itself (if applicable), as well as the combinations of fuzzy match scores and match frequency scores for each matching node, weighted by distance along the shortest path. Thus, if one assumes that node 402A has a fuzzy match score of 0.5 and a match frequency score of 0.2, node 402C has a fuzzy match score of 0.4 and a match frequency score of 0.2, node 402G has a fuzzy match score of 0.37 and a match frequency score of 0.2, and node 402B has a fuzzy match score of 0.5 and no match frequency score, then the ranking score assigned to, for example, node 402B will be based on the combination of these scores, with the fuzzy score for node 402B weighted the highest, the scores for nodes 402A and 402C weighted the next highest (distance of 1 from node 402B) and the scores for node 402G weighted the least (distance of 3 from node 402B).

Likewise, the ranking score for a non-matching node like 402F will be based on the combination of the above scores, with the scores for nodes 402A and 402G weighted the highest (distance of 1 from node 402F), the fuzzy score for node 402B weighted the next highest (distance of 2 from node 402F) and the scores for node 402C weighted the least (distance of 3 from node 402F).

Once all of the nodes 402A-402H have been assigned a ranking score, the ranking scores may be compared with a threshold that may indicate whether the corresponding node 402A-402H should be returned as a result. This may be performed by the threshold comparer 706, which eliminates from the search results any potential search result having a ranking score that does not exceed the threshold. For example, the ranking score for Hamburg 402H might be so low that it is not returned as a result. The nodes 402A-402H with ranking scores that exceed this threshold, however, can be sorted according to their ranking scores by a search result sorter 708 and returned, in sorted form, as results.

Figure 8:
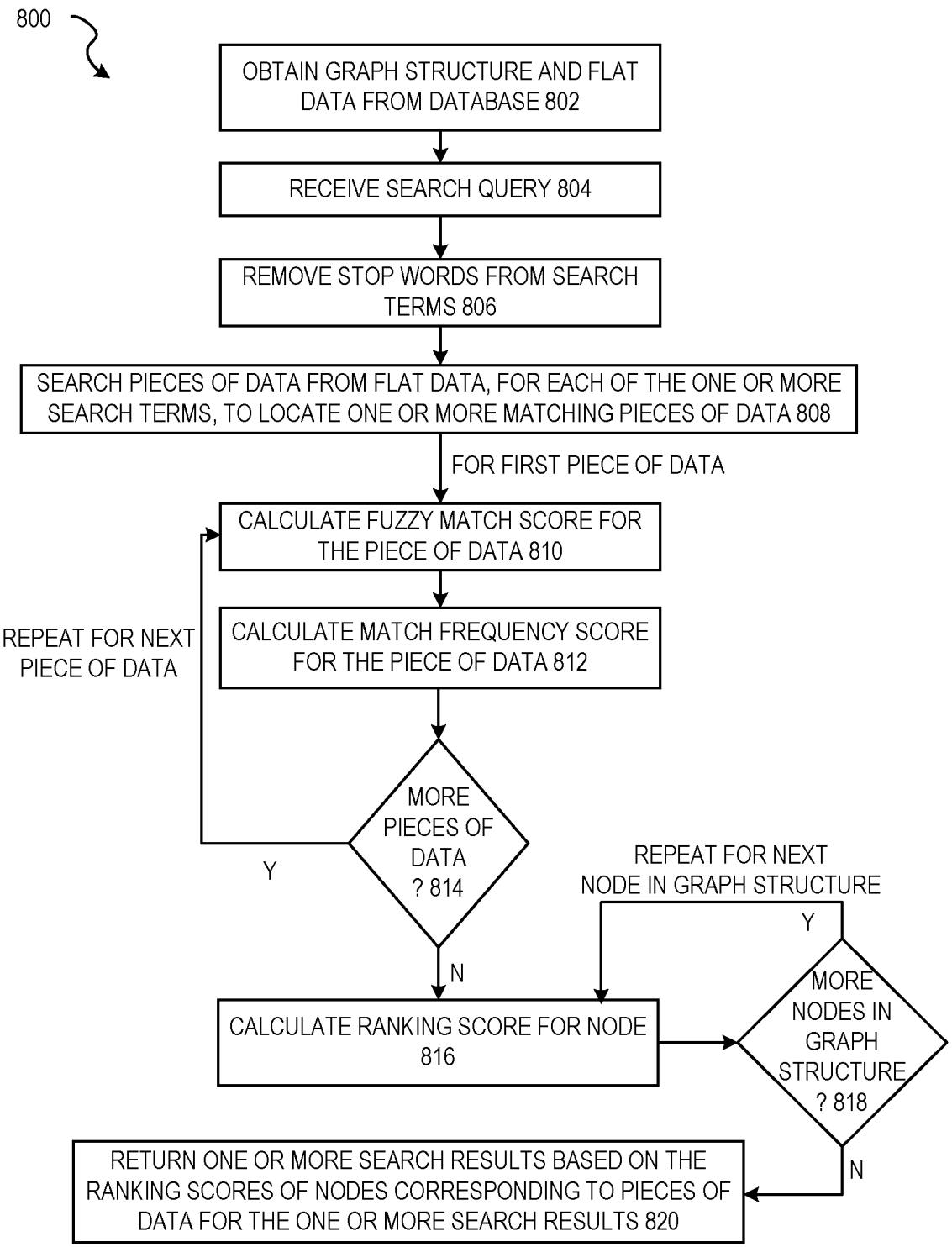
FIG. 8 is a flow diagram illustrating a method for searching data in a database in accordance with an example embodiment.

FIG. 8 is a flow diagram illustrating a method 800 for searching data in a database in accordance with an example embodiment. At operation 802, a graph structure and flat data corresponding to the graph structure may be obtained from a database. At operation 804, a search query is received. The search query contains one or more search terms. At operation 806, stop words are removed from the one or more search terms. At operation 808, for each of the one or more search terms, the pieces of data from the flat data are searched to locate one or more matching pieces of data from the flat data. A piece of data from the flat data matches if it contains at least one attribute with a value similar to the search term.

A loop is then begun for each matching piece of data from the flat data. At operation 810, a fuzzy match score is calculated for the piece of data. The fuzzy match score indicates how similar the at least one attribute in the matching piece of data is to the corresponding search term. At operation 812, a match frequency score is calculated. The match frequency score indicates how many attributes in the matching piece of data are similar to the corresponding search term. At operation 814, it is determined if there are any additional matching pieces of data. If so, the method 800 loops back to operation 810 for the next matching piece of data. If not, a loop is begun for each node in the graph structure. At operation 816, a ranking score is calculated for the node based on a combination of the fuzzy match score and the match frequency score for a corresponding piece of data from the flat data, if such a fuzzy match score and match frequency score exist for the corresponding piece of data from the flat data, as well as based on combinations of fuzzy match scores and match frequency scores for all matching pieces of data in the flat data, weighted based on distance along a shortest possible path between the node and a node corresponding to the corresponding matching piece of data in the flat data. At operation 818 it is determined if there are any more nodes in the graph structure. If so, then the method 800 loops back to operation 816 for the next node in the graph structure. If not, then at operation 820 one or more search results are returned based on the ranking scores of nodes corresponding to pieces of data for the one or more search results.

Figure 9:
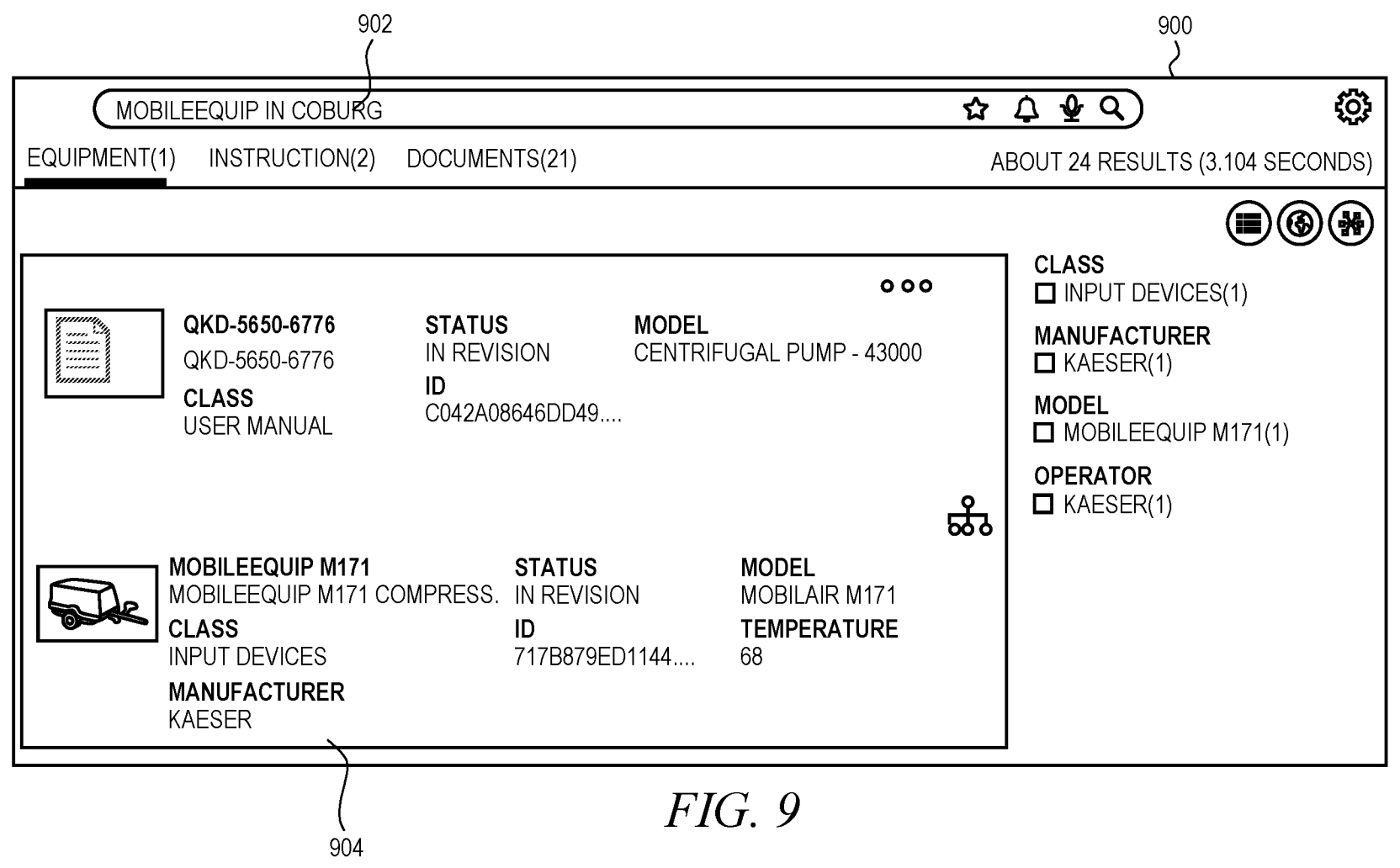

FIG. 9 is a screen capture illustrating a user interface 900 for search queries and results in accordance with an example embodiment. Here, user interface 900 includes a text box 902 where the user has typed the search term "MobileEquip in Coburg." A results area 904 presents sorted search results obtained using the search process described earlier.

Figure 10:
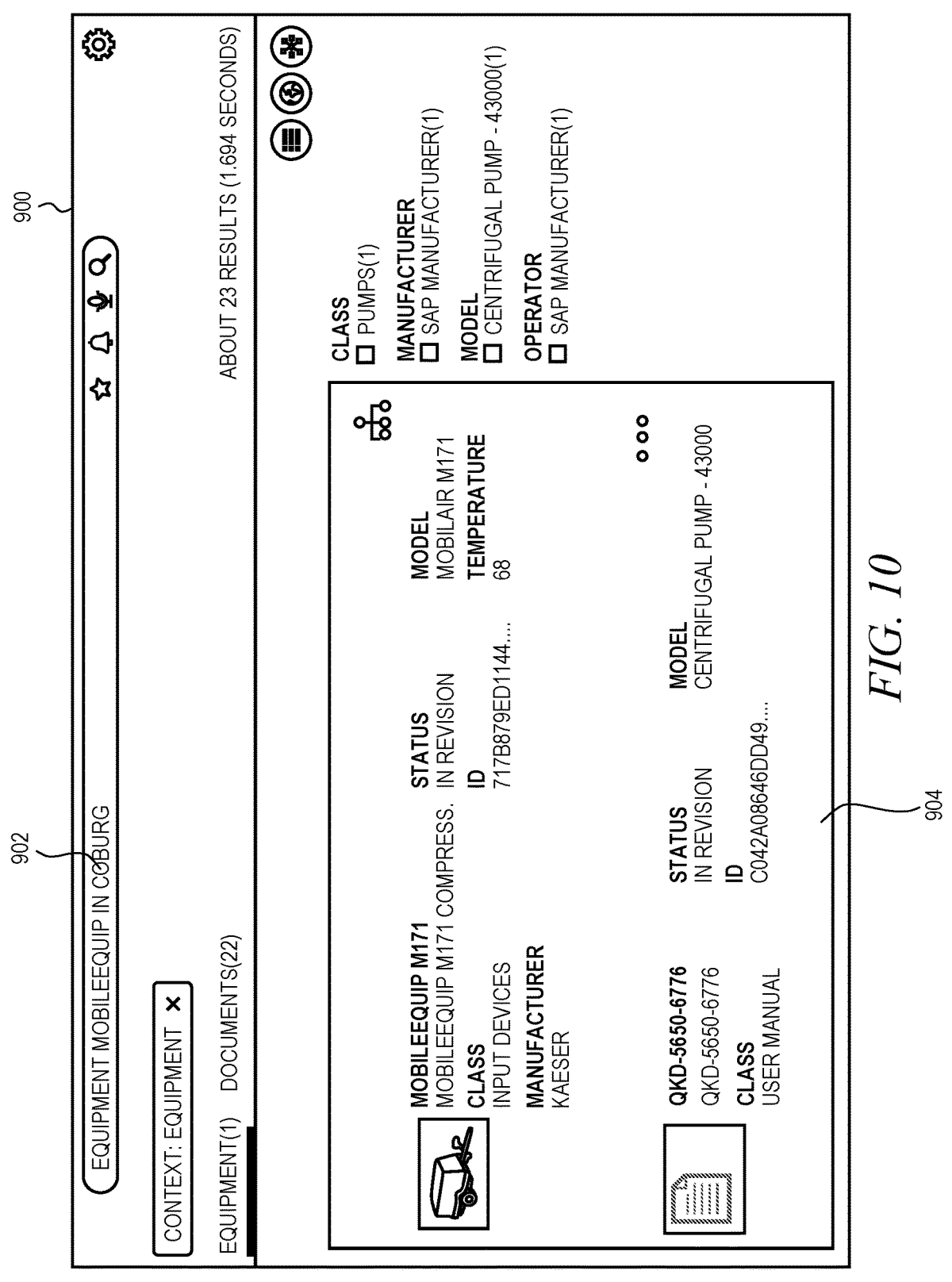

FIG. 10 is a screen capture illustrating another search entered into the user interface 900 for search queries and results in accordance with an example embodiment. Here, the user has typed "equipment MobileEquip in Coburg", which is a slight modification of the search in FIG. 9. As can be seen, this causes a change to the ordering of the search results in the results area 904. Specifically, since the addition of the term equipment to the search query causes equipment nodes matching "MobileEquip" to have two matching attributes rather than one, specifically matching on the type name "equipment" and the name "MobileEquip", those results are now ranked higher than the results for matches to "Coburg."

While the above search results are customer-specific, in ERP the customer is typically an organization such as a business, sometimes a large business. The person conducting the search could have one of many different roles in the organization, such as a purchasing manager or a sales manager. The searches themselves, therefore, may have different meanings for the different roles. In an example embodiment, this issue may be addressed in a number of ways. Context-based ranking may be used. Specifically, a context-based ranker 710 may utilize anchor points to come up with a context-based ranking of search results. One anchor is the type and the other anchor is the attribute. For example, a user may perform the search "sales order pump". Here, sales order is the type and pump is the attribute. In an example embodiment, both these anchors are saved. Then, if the user later searches "MobileEquip," the system will be able to identify that even though the type is not specified in this query, since "MobileEquip" is an attribute of an anchored type (sales order), the user may have been wishing to search for a sales order related to "MobileEquip" as opposed to other types of data, such as a purchase contract. The ranking score of the nodes in the graph structure 400 may then be dynamically modified to factor in this bias towards previously anchored searches. This may be known as context-based ranking.

In an example embodiment, not only the anchors from the queries but also the search results from the queries are saved. Specifically, the IDs of the pieces of data returned as search results are saved (the results themselves need not be persisted). A matrix may be created with users on one axis and search terms on the other, with the entries in the matrix indicating the number of times the corresponding search terms were searched. The users may be grouped into groups with users who performed similar searches. When a new query is received from a user, it may be compared to searches from users in the same group as the searching user. Clusters of frequently searched terms among different user groups may be identified. For example, the system may determine that a first group of users typically searches for sales orders when searching for the term "pump", but another group of users typically searches for purchasing contracts when searching for the term "pump." This may be known as history-based ranking. A history-based ranker 712 may then use these clusters to provide rankings of the search results based on history. This information can then be used to dynamically alter the rankings of the search results provided by the ranking scores.

In one example embodiment, the above context- and history-based ranking approaches are combined and used to break ties in the ranking scores. Thus, if a first node has a higher-ranking score than a second node, the first node will still be ranked higher even after context- and history-based ranking approaches are used, but if the second node and the third node have the same ranking score (which can commonly occur in ERP systems), then it is possible that the third node could be re-ranked to be displayed higher than the second node. (In this example, the system may by default display results corresponding to nodes having tied ranking scores in the order in which they are found using the search algorithm, resulting in the second node ordinarily being displayed higher than the third node in the results, until the context- and history-based ranking approaches are applied to break the tie.)

Since the context- and history-based ranking approached can be applied dynamically, in some systems it may be beneficial for some or all of the context- and history-based ranking to be applied after the initial results have been, or while they are being, displayed. This is especially useful in systems where the context- and history-based ranking algorithms would potentially slow down the delivery of results due to them taking a noticeable amount of time longer than merely the search algorithm described earlier.

Thus, in some example embodiments, the results of the earlier-described search algorithm are displayed and then those results are dynamically shifted on the display as the context- and/or history-based ranking algorithms are applied. For example, the earlier described search algorithm on graph structure 400 may return the result corresponding to the following nodes, in this order: MobileEquip 402A, MobileEquip 402C, MobileEquips 402G Coburg. 402B. Thus, these results may appear to the user in that order. However, assume that the ranking scores for MobileEquip 402C and MobileEquips 402G were equal and the context- and/or history-based approaches reveal that MobileEquips 402G should be ranked higher than MobilEquip 402C due to a higher frequency of searches on MobileEquips 402G by users in the same user group as the searching user. As such, the display may alter the displayed results so that the result for MobileEquips 402G is swapped with the result for MobilEquip 402C. The user may see the initial ranking first, and then see the initial ranking be altered to the final ranking. This alteration may continue through all the results until the context- and/or history-based approaches have been fully applied.

Figure 11:
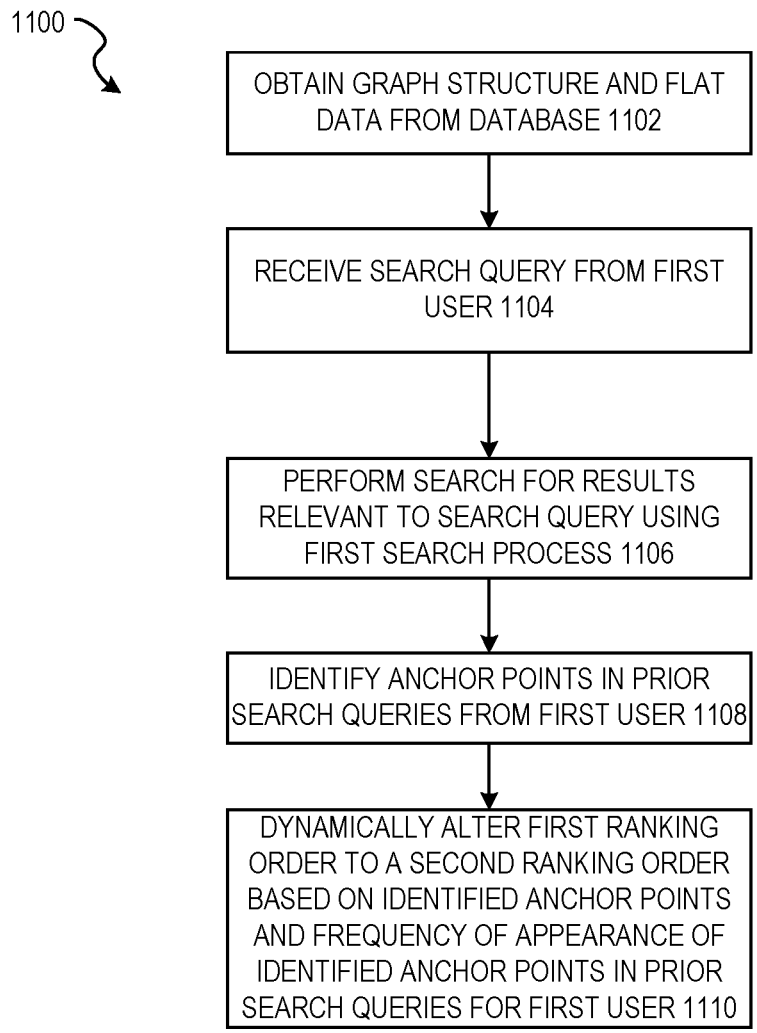
FIG. 11 is a flow diagram illustrating a method for context-based ranking of search results in accordance with an example embodiment.

FIG. 11 is a flow diagram illustrating a method 1100 for context-based ranking of search results in accordance with an example embodiment. At operation 1102, a graph structure and flat data corresponding to the graph structure are obtained from a database. At operation 1104, a search query is received from a first user. The search query contains one or more search terms. At operation 1106, a search for results relevant to search query is performed using a first search process. The first search process uses the graph structure and flat data corresponding to the graph structure to rank search results according to a first ranking order.

At operation 1108, anchor points in prior search queries from the first user are identified. Each anchor point is a data type or attribute name from the flat data. At operation 1110, the first ranking order is dynamically altered to a second ranking order based on the identified anchor points in prior search queries from the first user and frequency of appearance of the identified anchor points in prior search queries from the first user.

Figure 12:
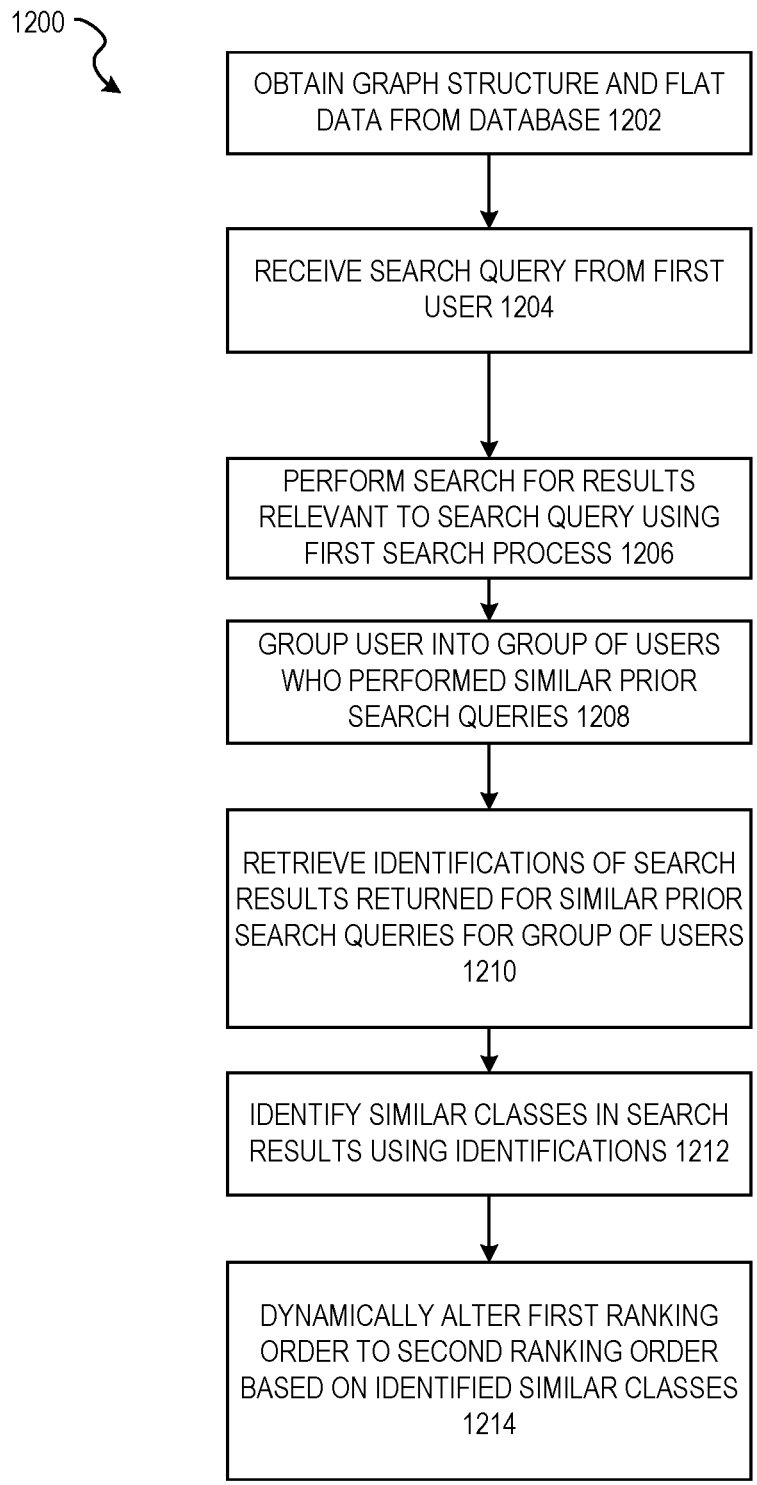
FIG. 12 is a flow diagram illustrating a method for history-based ranking of search results in accordance with an example embodiment.

FIG. 12 is a flow diagram illustrating a method 1200 for history-based ranking of search results in accordance with an example embodiment.

At operation 1202, a graph structure and flat data corresponding to the graph structure are obtained from a database. At operation 1204, a search query is received from a first user. The search query contains one or more search terms. At operation 1206, a search for results relevant to search query is performed using a first search process. The first search process uses the graph structure and flat data corresponding to the graph structure to rank search results according to a first ranking order.

At operation 1208, the user is grouped into a group of users who performed similar prior search queries. A t operation 1210, identifications of search results returned for the similar prior search queries for the group of users are retrieved. At operation 1212, similar classes in search results are identified using the identifications. At operation 1214, the first ranking order is dynamically altered to a second ranking order based on the identified similar classes.

In the context of the system 100 of FIG. 1, the search engine back-end 118 may push the results from the initial search from, for example, the method 800 of FIG. 8 to the search engine front-end 120. The user interface 122 may display these results on the user device 124. Then, the search engine back-end 118 can calculate the context-based algorithm results from, for example, the method 1100 of FIG. 11, and may push the results of this to the search engine front-end 120. The user interface 122 can move one or more of the displayed results based on these results. Then the search engine back-end 118 can calculate the history-based algorithm results from, for example, the method 1200 of FIG. 12, and may push the results of this to the search engine front-end 120. The user interface 122 can move one or more of the displayed results based on these results. The result is that the user's experience is dynamically updated with more and more relevant rankings for the results while not requiring a significant amount of time for the user to see initial results.

Figure 13:
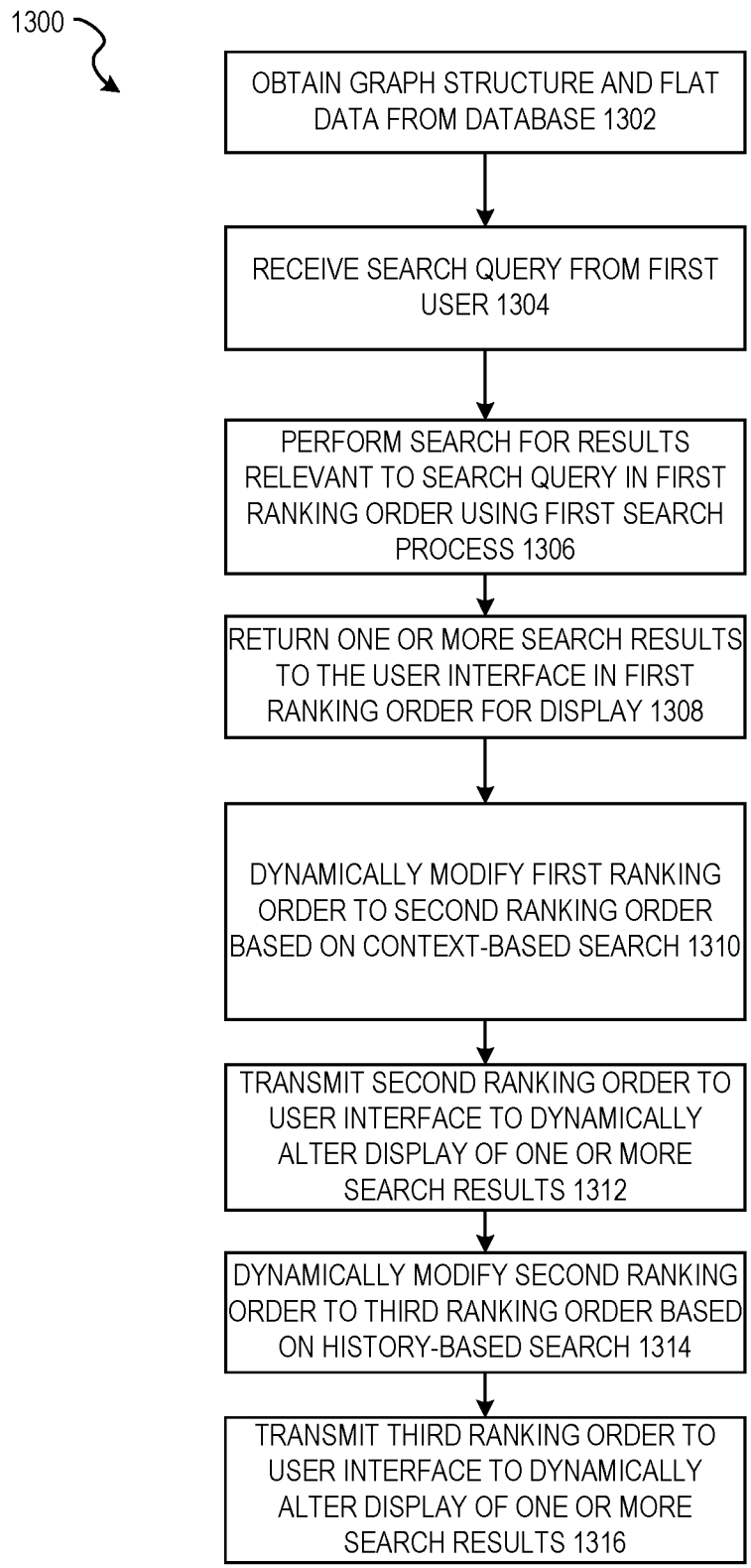
FIG. 13 is a flow diagram illustrating a method for dynamic rendering of search results, in accordance with an example embodiment.

FIG. 13 is a flow diagram illustrating a method 1300 for dynamic rendering of search results, in accordance with an example embodiment. At operation 1302, a graph structure and flat data corresponding to the graph structure are obtained from a database. At operation 1304, a search query is received from a first user. The search query contains one or more search terms. At operation 1306, a search for results relevant to search query is performed using a first search process. The first search process uses the graph structure and flat data corresponding to the graph structure to rank search results according to a first ranking order.

At operation 1308, one or more search results are returned to the user interface in the first ranking order for display.

At operation 1310, the first ranking order is dynamically modified to a second ranking order based on a context-based search. At operation 1312, the second ranking order is transmitted to a user interface to dynamically alter display of one or more search results to match the second ranking order.

At operation 1314, the second ranking order is dynamically modified to a third ranking order based on a history-based search. At operation 1316, the third ranking order is transmitted to the user interface to dynamically alter display of the one or more search results to match the third ranking order.

Structured Query Language (SQL) is a computer language commonly used to manage data held in relational databases. While the above-processes discuss flattening at least some of the data from relational tables into flat data, there still are some circumstances where it would be beneficial to search on the original relational data. For example, individual sensor measurements may still be stored in relational form and not flattened, and therefore searches on sensor measurements, such as looking for data results where a particular equipment had a temperature in a certain range. Additionally, there are circumstances where the user may wish to modify the data in some way, such as by creating data, editing values of existing data, or deleting existing data. In some example embodiments, an additional component may be added to the search engine back-end 118 in order to handle these situations. This additional component may be called a SQL command former.

Figure 14:
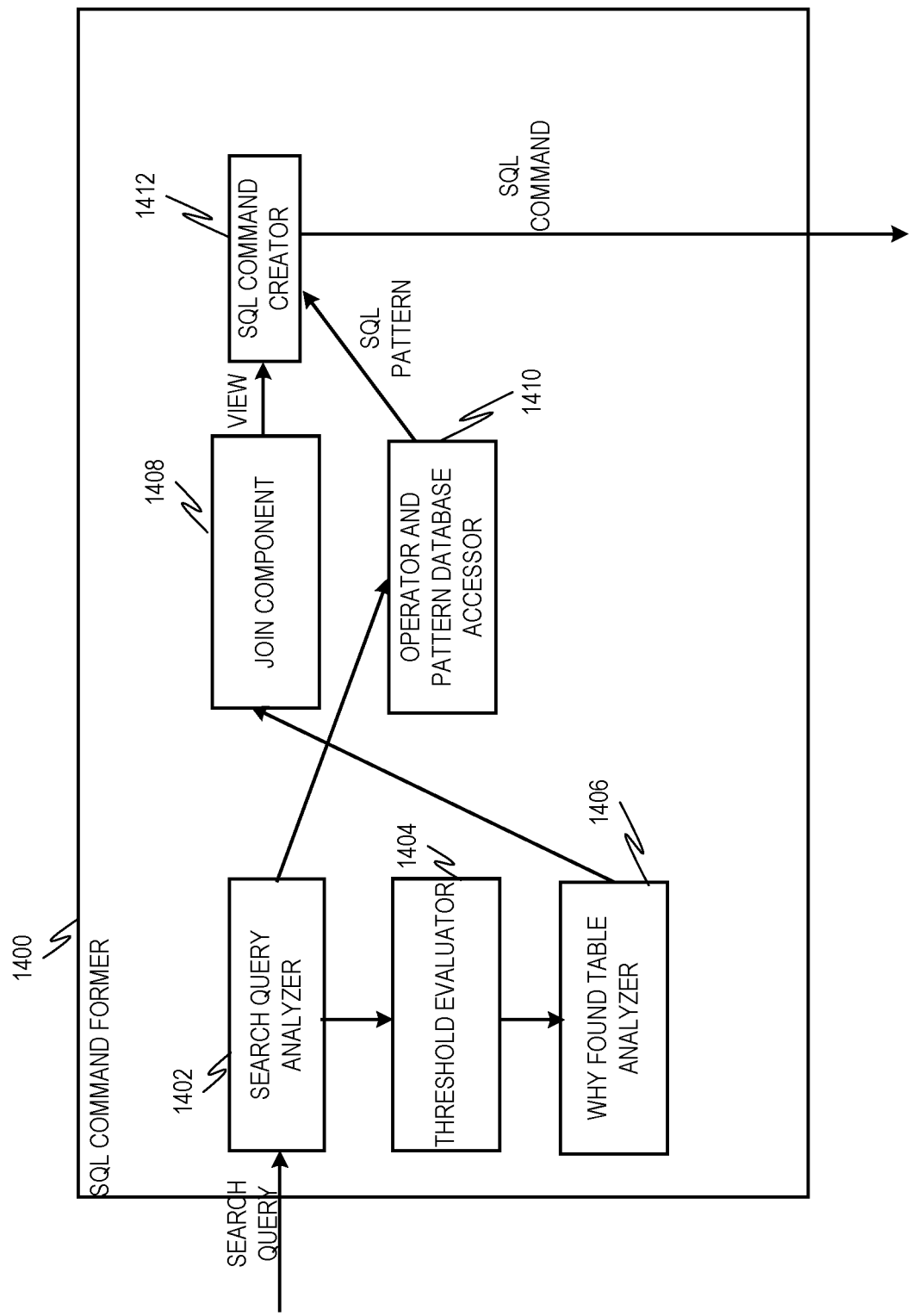
FIG. 14 is a block diagram illustrating a Structured Query Language (SQL) command former, in accordance with an example embodiment.

FIG. 14 is a block diagram illustrating a SQL command former 1400 in accordance with an example embodiment. In an example embodiment, a search query analyzer 1402 may analyze a search query. For ease of description, this user input will be described as a search query, although it is not necessary that the user input actually request data, as it is possible that this "search query" could instead express a desire to modify the relational data.

The search query is analyzed by the search query analyzer 1402. First the query is tokenized. In natural language processing (NLP), there is the concept of stop words. These are words without too much meaning, such as articles and prepositions (a, an, of, etc.). A stop word dictionary may be used to identify the stop words in the query. Specifically, each token is compared, individually and in various combinations of tokens, to the stop word dictionary, and identified stop words can be deleted from the query. For example, if the query is "Equipment MobileEquip in Coburg", the individual tokens "Equipment," "MobileEquip," "in," and "Coburg" may be compared to a stop word dictionary, which may identify "in" as being a stop word.

In the ERP realm, however, some traditional stop words have meaning. For example, in some chemical formulas, the term "of" surrounded by other words implies a certain important aspect of the formula. Merely deleting the term "of" from a search query blindly might result in incorrect NLP of the query in such circumstances.

In order to remedy this, in an example embodiment, all indexed data for a customer is added to a customer-specific dictionary. When an input query is tokenized, in addition to comparing the individual tokens to terms in the stop word dictionary, all the combinations of neighboring words are compared to the customer-specific dictionary. For instance, in the above example, the combinations of neighboring tokens will be "Equipment MobileEquip," "Equipment MobileEquip in," "Equipment MobileEquip in Coburg," "MobileEquip in," MobileEquip in Coburg," and "in Coburg." Each of these combinations may be compared with phrases in the customer-specific dictionary. For any token in the query that is identified as a stop word, it is determined if that token is contained in some combination of tokens that appears in the customer-specific dictionary. If so, then the token that is identified as a stop word is not deleted from the query. Otherwise, it may be deleted from the query.

Thus, in the above example, if either of the token combinations "Equipment MobileEquip in Coburg," "MobileEquip in," MobileEquip in Coburg," or "in Coburg" appear in the customer-specific dictionary, then the token "in" is not deleted from the query, even if "in" is a stop word identified in the stop word dictionary. If none of these token combinations, however, appears in the customer-specific dictionary, then the token "in" is deleted from the query if it is identified in the stop word dictionary.

The tokens may then be searched on the flat data 300 and graph structure 400, as described earlier. Specifically, all the nodes in the graph structure 400 are assigned a ranking score. Eventually, in order to create a SQL command based on the input query, views will be created by performing joins on various pieces of the flat data 300. However, performing joins on all the various combinations of the pieces of flat data 300 would be too processor-intensive in most applications. While the second threshold described above may help limit returned results to just results having high ranking scores, in some instances this might still be too many results. As such, in an example embodiment, a third threshold is used. This third threshold is not score-based but is instead quantity-of-results based. For example, the third threshold may be set at 1000 results. As such, only up to the top 1000 search results (based on corresponding ranking scores) will be joined.

Therefore, at this stage, results are first obtained from the flat data 300 and graph structure 400 using the search and ranking algorithm described above with respect to FIG. 8. These results are sorted based on ranking score. All but the top X of these results are discarded by a threshold evaluator 1404, where X is the third threshold.

Using the remaining results, the why found table 704 described earlier (FIG. 7) is accessed by a why found table analyzer 1406 to identify, for each of the remaining results, a target piece of data. For any particular source piece of data (search result), the target piece of data may be the piece of data corresponding to the attribute identified in the why found table 704. For example, if the search algorithm identified that an Equipment MobileEquip node was matched due to its underlying data containing both a type name of Equipment and a name of MobileEquip, then the why found table 704 would contain one row identifying the source piece of data (the data corresponding to the node Equipment MobileEquip) and the first why found (type name), and another row identifying the source piece of data (the data corresponding to the node Equipment Mobile-Equip) and the second why found (name). This information is then used by a join component 1408 when joining all pieces of data for nodes in the top X search results.

All of these joint pieces of data may be called "views," or collectively, a "view."

The view/views tell the system what needs to be the target(s) of the eventual SQL command, but does not tell the system what needs to be the commands, modifiers, and operators included in that SQL command. For the operators, an operator database may be used. The operator database contains common query operators with mappings to their corresponding SQL operators. In many instances, the query operator will be the same as the corresponding SQL operator, such as for the ">" operator, which means "greater than." If a user types ">" in a query, then when this query is turned into a SQL command ">" and will also be used. In this case, the operator database was mainly used to identify the ">" in the query as a database (differentiated from other parts of the query). In some instances, there may be multiple query operators that map to the same SQL operator. For example, there may be a separate operator database entry for "greater than" in the query, which also maps to the ">" SQL operator, which allows the user to type either ">" or "greater than" in the query and obtain the same result.

The operator database may be used along with a pattern database. The pattern database includes patterns of data types and operators and how they translate into SQL commands. In some example embodiments, the operator database and the pattern database may actually be combined and accessed as a single database, accessed by an operator and pattern database accessor 1410. For example, rather than searching for an individual operator such as ">", the search on this combined operator and pattern database would be on the operator and the data types surrounding the operator. So if in the query the ">" is followed by a measurement, then the search would be for ">[measurement]" in the operator and pattern database. If the query > is followed by a date, then the search would be for ">[date]" in the operator and pattern database.

Since as described earlier the type of each piece of data is classified at indexing time, these types are known. Thus, for example, the system would know that 10 is a measurement and Oct. 5, 2015 is a date. This typing can actually vary from customer to customer since, as described earlier, the classification at indexing time is on a customer-by-customer basis. Thus, for one customer 10 is a measurement while for another customer 10 is a currency value.

The result is that the pattern database (or possibly a combined operator and pattern database) can provide a SQL pattern of commands, modifiers, and operators. These can be combined with the view(s) determined earlier to form a SQL command. This may be performed using a SQL command creator 1412, which combines the view(s) from the join component 1408 and the SQL pattern from the operator and pattern database accessor 1410.

Thus take, for example, the user query "Equipment MobileEquip with pressure>10": "with" may be determined to be a stop word, ">" an operator, and "10" a data type. The remaining terms, "Equipment", "MobileEquip", and "pressure", may be tokenized and their various neighboring permutations searched on the flat data 300 and graph structure 400. The results from this search may be ranked and all but the top X results discarded. The remaining results may then be joined based on the why found table 704 with target pieces of data in the flat data 300 to form the view. The operator and pattern database accessor 1410 may identify that "with [search term]>[measurement]" should be translated to the SQL command "select from [view] where [attribute]>[measurement.]", thus the final SQL command "select from view where pressure>10" can be formed.

It should be noted that this SQL command formation from a search "query" may be performed not only on searches for data, but also on commands to modify, delete, or add data. The user may be able to type, for example, "delete Equipment MobileEquip with pressure>10" and the SQL command will be "delete from view where pressure>10." This SQL command is still known as a SQL query even though it is performing a modification instead of a pure read, and likewise the initial query the user types to form this delete command can also be known as a query. Thus, the system is flexible to perform all sorts of different types of SQL commands using freeform input by the user and the techniques described above.

Figure 15:
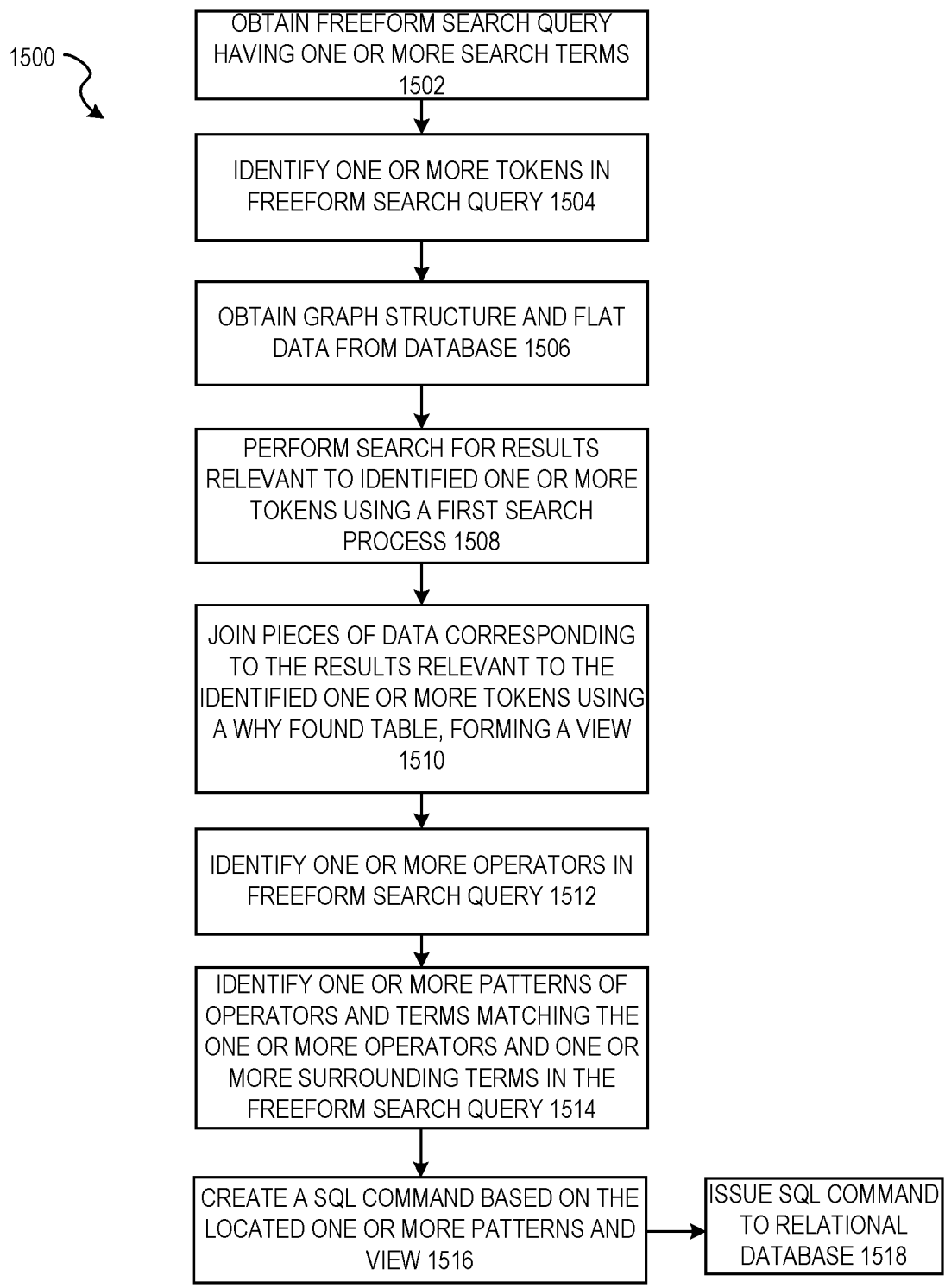
FIG. 15 is a flow diagram illustrating a method of forming a SQL query from a freeform search query in accordance with an example embodiment.

FIG. 15 is a flow diagram illustrating a method 1500 of forming a SQL query from a freeform search query in accordance with an example embodiment. At operation 1502, a freeform search query having one or more search terms is obtained. At operation 1504, one or more tokens are identified in the freeform search query. Each token corresponds to a search term or combination of neighboring search terms in the freeform search query.

At operation 1506, a graph structure and flat data corresponding to the graph structure are obtained from a database. At operation 1508, a search for results relevant to the identified one or more tokens is performed using a first search process. The first search process uses the graph structure and flat data corresponding to the graph structure to rank search results according to a first ranking order. The first search process additionally populates a why found table (e.g., the why found table 704) indicating one or more reasons why each search result was found.

At operation 1510, pieces of data corresponding to the results relevant to the identified one or more tokens are joined using the why found table, forming a view. At operation 1512, one or more operators are identified in the freeform search query. At operation 1514, one or more patterns of operators and terms are identified, in a pattern database, matching the one or more operators and one or more surrounding terms in the freeform search query. At operation 1516, based on the located one or more patterns and the view, a SQL command is created corresponding to the freeform search query. At operation 1518, the SQL command is issued to a relational database.

EXAMPLES

Example 1

A system comprising:
at least one hardware processor; and
a computer-readable medium storing instructions that, when executed by the at least one hardware processor, cause the at least one hardware processor to perform operations comprising:
obtaining a freeform search query having one or more search terms;
identifying one or more tokens in the freeform search query, each token corresponding to a search term or combination of neighboring search terms in the freeform search query;
obtaining, from a database, a graph structure and flat data corresponding to the graph structure, the graph structure containing a plurality of nodes, each node corresponding to a data type of the flat data and corresponding to one or more pieces of data in the flat data of the corresponding data type, the graph structure further containing a plurality of edges connecting one or more of the plurality of nodes, each edge corresponding to a link between an attribute of a node at one side of the edge and an attribute of a node at another side of the edge;
performing a search for results relevant to the identified one or more tokens using a first search process, the first search process using the graph structure and flat data corresponding to the graph structure to rank search results according to a first ranking order, the search additionally populating a why found table indicating one or more reasons why each search result was found;
joining pieces of data corresponding to the results relevant to the identified one or more tokens using the why found table, forming a view;
identifying one or more operators in the freeform search query;
locating one or more patterns of operators and terms, in a pattern database, matching the one or more operators and one or more surrounding terms in the freeform search query; and
based on the located one or more patterns and the view, creating a structured query language (SQL) command corresponding to the freeform search query.

Example 2

The system of Example 1, wherein the first search process includes:
removing stop words from the one or more search terms;
for each of the one or more search terms, searching the pieces of data from the flat data to locate one or more matching pieces of data from the flat data, wherein a piece of data from the flat data matches if it contains at least one attribute with a value that is similar to the search term;
for each matching piece of data from the flat data:
calculating a fuzzy match score, wherein the fuzzy match score indicates how similar the at least one attribute in the matching piece of data is to the corresponding search term; and calculating a match frequency score, wherein the match frequency score indicates how many attributes in the matching piece of data are similar to the corresponding search term;
for each node in the graph structure, calculating a ranking score based on a combination of the fuzzy match score and the match frequency score for a corresponding piece of data from the flat data, if such a fuzzy match score and match frequency score exist for the corresponding piece of data from the flat data, as well as based on combinations of fuzzy match scores and match frequency scores for all matching pieces of data in the flat data, weighted based on distance along a shortest possible path between the node and a node corresponding to the corresponding matching piece of data in the flat data;
returning one or more search results based on the ranking scores of nodes corresponding to pieces of data for the one or more search results.

Example 3

The system of any of Examples 1-2, wherein the identifying one or more operators in the freeform search query includes comparing the one or more search terms to an operator database.

Example 4

The system of any of Examples 1-3, wherein the operations further comprise eliminating all but a preset number of search results from the one or more search results.

Example 5

The system of any of Examples 1-4, wherein the operations further comprise issuing the SQL command to a relational database.

Example 6

The system of any of Examples 1-5, wherein the freeform search query indicates a deletion of data from the flat data.

Example 7

The system of any of Examples 1-6, wherein the freeform search query indicates an update of data in the flat data.

Example 8

A method comprising:
obtaining a freeform search query having one or more search terms;
identifying one or more tokens in the freeform search query, each token corresponding to a search term or combination of neighboring search terms in the freeform search query;
obtaining, from a database, a graph structure and flat data corresponding to the graph structure, the graph structure containing a plurality of nodes, each node corresponding to a data type of the flat data and corresponding to one or more pieces of data in the flat data of the corresponding data type, the graph structure further containing a plurality of edges connecting one or more of the plurality of nodes, each edge corresponding to a link between an attribute of a node at one side of the edge and an attribute of a node at another side of the edge;

performing a search for results relevant to the identified one or more tokens using a first search process, the first search process using the graph structure and flat data corresponding to the graph structure to rank search results according to a first ranking order, the search additionally populating a why found table indicating one or more reasons why each search result was found;

joining pieces of data corresponding to the results relevant to the identified one or more tokens using the why found table, forming a view;

identifying one or more operators in the freeform search query;

locating one or more patterns of operators and terms, in a pattern database, matching the one or more operators and one or more surrounding terms in the freeform search query; and based on the located one or more patterns and the view, creating a structured query language (SQL) command corresponding to the freeform search query.

Example 9

The method of Example 8, wherein the first search process includes:

removing stop words from the one or more search terms;

for each of the one or more search terms, searching the pieces of data from the flat data to locate one or more matching pieces of data from the flat data, wherein a piece of data from the flat data matches if it contains at least one attribute with a value that is similar to the search term;

for each matching piece of data from the flat data:
calculating a fuzzy match score, wherein the fuzzy match score indicates how similar the at least one attribute in the matching piece of data is to the corresponding search term;
calculating a match frequency score, wherein the match frequency score indicates how many attributes in the matching piece of data are similar to the corresponding search term;

for each node in the graph structure, calculating a ranking score based on a combination of the fuzzy match score and the match frequency score for a corresponding piece of data from the flat data, if such a fuzzy match score and match frequency score exist for the corresponding piece of data from the flat data, as well as based on combinations of fuzzy match scores and match frequency scores for all matching pieces of data in the flat data, weighted based on distance along a shortest possible path between the node and a node corresponding to the corresponding matching piece of data in the flat data; and returning one or more search results based on the ranking scores of nodes corresponding to pieces of data for the one or more search results.

Example 10

The method of any of Examples 8-9, wherein the identifying one or more operators in the freeform search query includes comparing the one or more search terms to an operator database.

Example 11

The method of any of Examples 8-10, further comprising eliminating all but a preset number of search results from the one or more search results.

Example 12

The method of any of Examples 8-11, further comprising issuing the SQL command to a relational database.

Example 13

The method of any of Examples 8-12, wherein the freeform search query indicates a deletion of data from the flat data.

Example 14

The method of any of Examples 8-13, wherein the freeform search query indicates an update of data in the flat data.

Example 15

A non-transitory machine-readable storage medium comprising instructions that, when implemented by one or more machines, cause the one or more machines to perform operations comprising:

obtaining a freeform search query having one or more search terms;

identifying one or more tokens in the freeform search query, each token corresponding to a search term or combination of neighboring search terms in the freeform search query;

obtaining, from a database, a graph structure and flat data corresponding to the graph structure, the graph structure containing a plurality of nodes, each node corresponding to a data type of the flat data and corresponding to one or more pieces of data in the flat data of the corresponding data type, the graph structure further containing a plurality of edges connecting one or more of the plurality of nodes, each edge corresponding to a link between an attribute of a node at one side of the edge and an attribute of a node at another side of the edge;

performing a search for results relevant to the identified one or more tokens using a first search process, the first search process using the graph structure and flat data corresponding to the graph structure to rank search results according to a first ranking order, the search additionally populating a why found table indicating one or more reasons why each search result was found;

joining pieces of data corresponding to the results relevant to the identified one or more tokens using the why found table, forming a view;

identifying one or more operators in the freeform search query;

locating one or more patterns of operators and terms, in a pattern database, matching the one or more operators and one or more surrounding terms in the freeform search query; and based on the located one or more patterns and the view, creating a structured query language (SQL) command corresponding to the freeform search query.

Example 16

The non-transitory machine-readable storage medium of Example 15, wherein the first search process includes:

removing stop words from the one or more search terms;

for each of the one or more search terms, searching the pieces of data from the flat data to locate one or more matching pieces of data from the flat data, wherein a piece of data from the flat data matches if it contains at least one attribute with a value that is similar to the search term;

for each matching piece of data from the flat data:

calculating a fuzzy match score, wherein the fuzzy match score indicates how similar the at least one attribute in the matching piece of data is to the corresponding search term; and calculating a match frequency score, wherein the match frequency score indicates how many attributes in the matching piece of data are similar to the corresponding search term;

for each node in the graph structure, calculating a ranking score based on a combination of the fuzzy match score and the match frequency score for a corresponding piece of data from the flat data, if such a fuzzy match score and match frequency score exist for the corresponding piece of data from the flat data, as well as based on combinations of fuzzy match scores and match frequency scores for all matching pieces of data in the flat data, weighted based on distance along a shortest possible path between the node and a node corresponding to the corresponding matching piece of data in the flat data; and returning one or more search results based on the ranking scores of nodes corresponding to pieces of data for the one or more search results.

Example 17

The non-transitory machine-readable storage medium of any of Examples 15-16, wherein the identifying one or more operators in the freeform search query includes comparing the one or more search terms to an operator database.

Example 18

The non-transitory machine-readable storage medium of any of Examples 15-17, wherein the operations further comprise eliminating all but a preset number of search results from the one or more search results.

Example 19

The non-transitory machine-readable storage medium of any of Examples claim 15-18, wherein the operations further comprise issuing the SQL command to a relational database.

Example 20

The non-transitory machine-readable storage medium of any of Examples 15-19, wherein the freeform search query indicates a deletion of data from the flat data.

Figure 16:
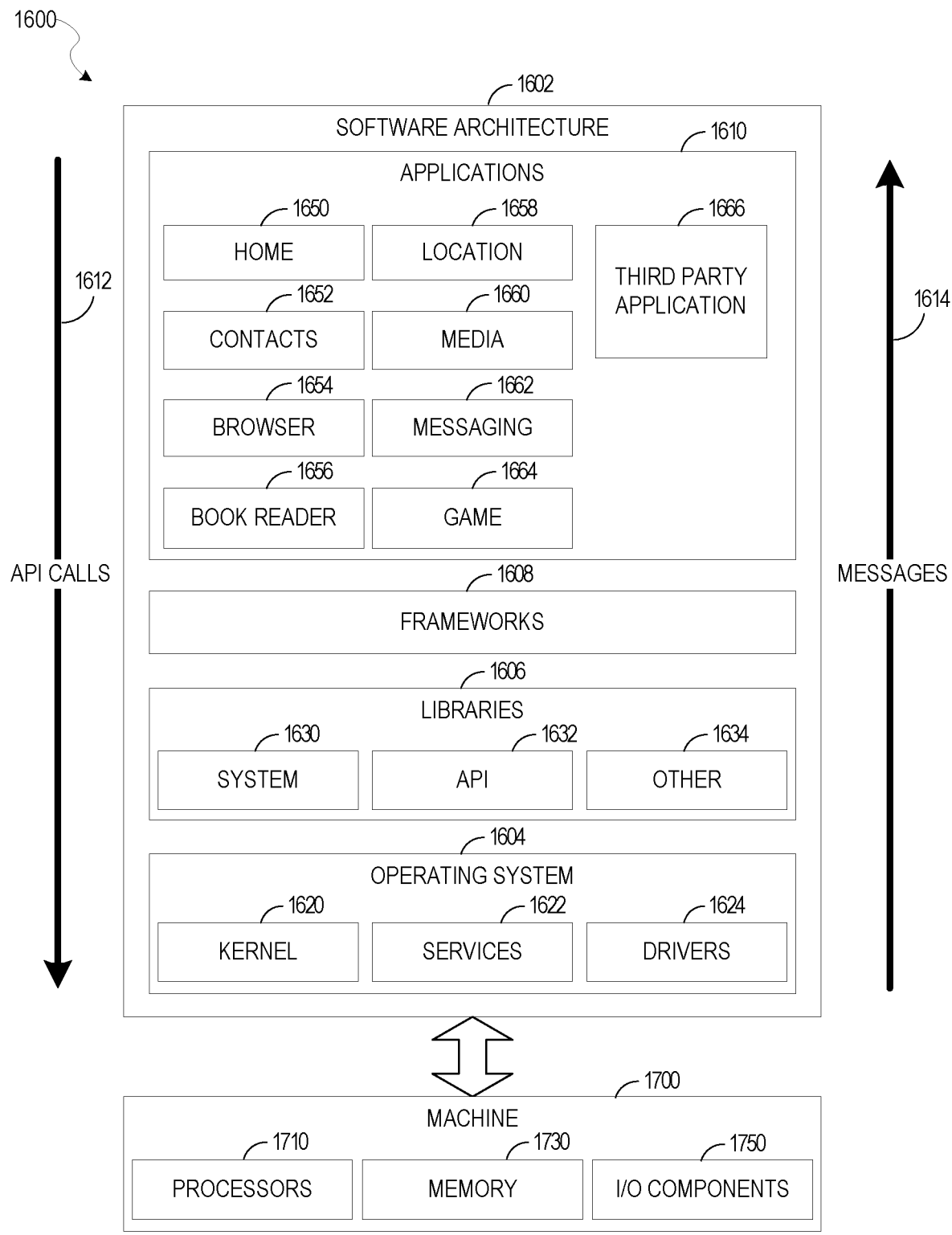
FIG. 16 is a block diagram illustrating an architecture of software, which can be installed on any one or more of the devices described above.

FIG. 16 is a block diagram 1600 illustrating an architecture of software 1602, which can be installed on any one or more of the devices described above. FIG. 16 is merely a non-limiting example of a software architecture, and it will be appreciated that many other architectures can be implemented to facilitate the functionality described herein. In various embodiments, the software 1602 is implemented by hardware such as a machine 1700 of FIG. 17 that includes processors 1710, memory 1730, and input/output (I/O) components 1750. In this example architecture, the software 1602 can be conceptualized as a stack of layers where each layer may provide a particular functionality. For example, the software 1602 includes layers such as an operating system 1604, libraries 1606, frameworks 1608, and applications 1610. Operationally, the applications 1610 invoke API calls 1612 through the software stack and receive messages 1614 in response to the API calls 1612, consistent with some embodiments.

In various implementations, the operating system 1604 manages hardware resources and provides common services. The operating system 1604 includes, for example, a kernel 1620, services 1622, and drivers 1624. The kernel 1620 acts as an abstraction layer between the hardware and the other software layers, consistent with some embodiments. For example, the kernel 1620 provides memory management, processor management (e.g., scheduling), component management, networking, and security settings, among other functionality. The services 1622 can provide other common services for the other software layers. The drivers 1624 are responsible for controlling or interfacing with the underlying hardware, according to some embodiments. For instance, the drivers 1624 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 1606 provide a low-level common infrastructure utilized by the applications 1610. The libraries 1606 can include system libraries 1630 (e.g., C standard library) that can provide functions such as memory allocation functions, string manipulation functions, mathematic functions, and the like. In addition, the libraries 1606 can include API libraries 1632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 1606 can also include a wide variety of other libraries 1634 to provide many other APIs to the applications 1610.

The frameworks 1608 provide a high-level common infrastructure that can be utilized by the applications 1610, according to some embodiments. For example, the frameworks 1608 provide various graphic user interface (GUI) functions, high-level resource management, high-level location services, and so forth. The frameworks 1608 can provide a broad spectrum of other APIs that can be utilized by the applications 1610, some of which may be specific to a particular operating system or platform.

In an example embodiment, the applications 1610 include a home application 1650, a contacts application 1652, a browser application 1654, a book reader application 1656, a location application 1658, a media application 1660, a messaging application 1662, a game application 1664, and a broad assortment of other applications, such as a third-party application 1666. According to some embodiments, the applications 1610 are programs that execute functions defined in the programs. Various programming languages can be employed to create one or more of the applications 1610, structured in a variety of manners, such as object-oriented programming languages (e.g., Objective-C, Java, or C++) or procedural programming languages (e.g., C or assembly language). In a specific example, the third-party application 1666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1666 can invoke the API calls 1612 provided by the operating system 1604 to facilitate functionality described herein.

Figure 17:
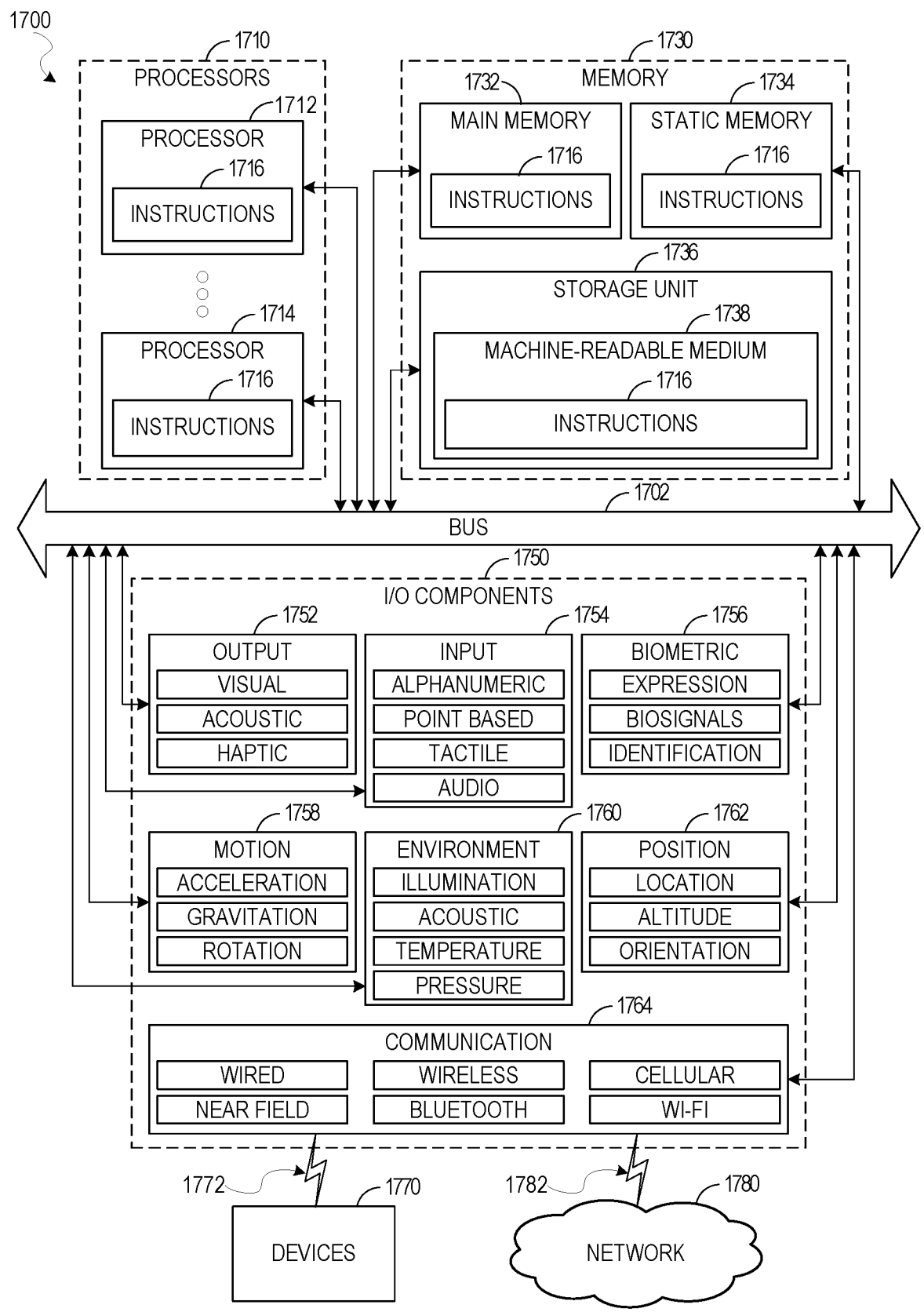
FIG. 17 illustrates a diagrammatic representation of a machine in the form of a computer system within which a set of instructions may be executed for causing the machine to perform any one or more of the methodologies discussed herein, according to an example embodiment.

FIG. 17 illustrates a diagrammatic representation of a machine 1700 in the form of a computer system within which a set of instructions may be executed for causing the machine 1700 to perform any one or more of the methodologies discussed herein, according to an example embodiment. Specifically, FIG. 17 shows a diagrammatic representation of the machine 1700 in the example form of a computer system, within which instructions 1716 (e.g., software, a program, an application, an applet, an app, or other executable code) for causing the machine 1700 to perform any one or more of the methodologies discussed herein may be executed. For example, the instructions 1716 may cause the machine 1700 to execute the method 800 of FIG. 8. Additionally, or alternatively, the instructions 1716 may implement FIGS. 1-15, and so forth. The instructions 1716 transform the general, non-programmed machine 1700 into a particular machine 1700 programmed to carry out the described and illustrated functions in the manner described. In alternative embodiments, the machine 1700 operates as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1716, sequentially or otherwise, that specify actions to be taken by the machine 1700. Further, while only a single machine 1700 is illustrated, the term "machine" shall also be taken to include a collection of machines 1700 that individually or jointly execute the instructions 1716 to perform any one or more of the methodologies discussed herein.

The machine 1700 may include processors 1710, memory 1730, and I/O components 1750, which may be configured to communicate with each other such as via a bus 1702. In an example embodiment, the processors 1710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an application-specific integrated circuit (ASIC), a Radio-Frequency Integrated Circuit (RFIC), another processor, or any suitable combination thereof) may include, for example, a processor 1712 and a processor 1714 that may execute the instructions 1716. The term "processor" is intended to include multi-core processors that may comprise two or more independent processors (sometimes referred to as "cores") that may execute instructions contemporaneously. Although FIG. 17 shows multiple processors 1710, the machine 1700 may include a single processor with a single core, a single processor with multiple cores (e.g., a multi-core processor), multiple processors with a single core, multiple processors with multiples cores, or any combination thereof.

The memory 1730 may include a main memory 1732, a static memory 1734, and a storage unit 1736, both accessible to the processors 1710 such as via the bus 1702. The main memory 1732, the static memory 1734, and the storage unit 1736 store the instructions 1716 embodying any one or more of the methodologies or functions described herein. The instructions 1716 may also reside, completely or partially, within the main memory 1732, within the static memory 1734, within the storage unit 1736, within at least one of the processors 1710 (e.g., within the processor's cache memory), or any suitable combination thereof, during execution thereof by the machine 1700.

The I/O components 1750 may include a wide variety of components to receive input, provide output, produce output, transmit information, exchange information, capture measurements, and so on. The specific I/O components 1750 that are included in a particular machine will depend on the type of machine. For example, portable machines such as mobile phones will likely include a touch input device or other such input mechanisms, while a headless server machine will likely not include such a touch input device. It will be appreciated that the I/O components 1750 may include many other components that are not shown in FIG. 17. The I/O components 1750 are grouped according to functionality merely for simplifying the following discussion, and the grouping is in no way limiting. In various example embodiments, the I/O components 1750 may include output components 1752 and input components 1754. The output components 1752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1750 may include biometric components 1756, motion components 1758, environmental components 1760, or position components 1762, among a wide array of other components. For example, the biometric components 1756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1758 may include acceleration sensor components (e.g., accelerometer), gravitation sensor components, rotation sensor components (e.g., gyroscope), and so forth. The environmental components 1760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1750 may include communication components 1764 operable to couple the machine 1700 to a network 1780 or devices 1770 via a coupling 1782 and a coupling 1772, respectively. For example, the communication components 1764 may include a network interface component or another suitable device to interface with the network 1780. In further examples, the communication components 1764 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1770 may be another machine or any of a wide variety of peripheral devices (e.g., coupled via a USB).

Moreover, the communication components 1764 may detect identifiers or include components operable to detect identifiers. For example, the communication components 1764 may include RFID tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1764, such as location via Internet Protocol (IP) geolocation, location via Wi-Fi® signal triangulation, location via detecting an NFC beacon signal that may indicate a particular location, and so forth.

The various memories (i.e., 1730, 1732, 1734, and/or memory of the processor(s) 1710) and/or the storage unit 1736 may store one or more sets of instructions and data structures (e.g., software) embodying or utilized by any one or more of the methodologies or functions described herein. These instructions (e.g., the instructions 1716), when executed by the processor(s) 1710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal and external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1780 or a portion of the network 1780 may include a wireless or cellular network, and the coupling 1782 may be a Code Division Multiple Access (CDMA) connection, a Global System for Mobile communications (GSM) connection, or another type of cellular or wireless coupling. In this example, the coupling 1782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1716 may be transmitted or received over the network 1780 using a transmission medium via a network interface device (e.g., a network interface component included in the communication components 1764) and utilizing any one of a number of well-known transfer protocols (e.g., HTTP). Similarly, the instructions 1716 may be transmitted or received using a transmission medium via the coupling 1772 (e.g., a peer-to-peer coupling) to the devices 1770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1716 for execution by the machine 1700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a non-transitory computer-readable medium storing instructions that, when executed by the at least one hardware processor, cause the at least one hardware processor to perform operations comprising:
   performing a search for results relevant to one or more tokens, the one or more tokens identified from a freeform search query, using a first search process, the first search process using a graph structure and flat data corresponding to the graph structure to rank search results according to a first ranking order, the search additionally populating a why found table indicating one or more reasons why each search result was found;
   joining pieces of information corresponding to the results relevant to the identified one or more tokens using the why found table, forming a view;
   identifying one or more operators in the freeform search query;
   locating one or more patterns of operators and terms, in a pattern database, matching the one or more operators and one or more surrounding terms in the freeform search query; and
   based on the located one or more patterns and the view, creating a command corresponding to the freeform search query.

2. The system of claim 1, wherein the first search process includes:
   removing stop words from the one or more search terms;
   for each of the one or more search terms, searching the pieces of information from the flat data to locate one or more matching pieces of information from the flat data, wherein a piece of data from the flat data matches if it contains at least one attribute with a value that is similar to the search term;
   for each matching piece of data from the flat data:
   calculating a fuzzy match score, wherein the fuzzy match score indicates how similar the at least one attribute in the matching piece of data is to the corresponding search term; and
   calculating a match frequency score, wherein the match frequency score indicates how many attributes in the matching piece of data are similar to the corresponding search term;
   for each node in the graph structure, calculating a ranking score based on a combination of the fuzzy match score and the match frequency score for a corresponding piece of data from the flat data, if such a fuzzy match score and match frequency score exist for the corresponding piece of data from the flat data, as well as based on combinations of fuzzy match scores and match frequency scores for all matching pieces of information in the flat data, weighted based on distance along a shortest possible path between the node and a node corresponding to the corresponding matching piece of data in the flat data; and
   returning one or more search results based on the ranking scores of nodes corresponding to pieces of information for the one or more search results.

3. The system of claim 1, wherein the identifying one or more operators in the freeform search query includes comparing the one or more search terms to an operator database.

4. The system of claim 1, wherein the operations further comprise eliminating all but a preset number of search results from the one or more search results.

5. The system of claim 1, wherein the operations further comprise issuing the command to a relational database.

6. The system of claim 1, wherein the freeform search query indicates a deletion of data from the flat data.

7. The system of claim 1, wherein the freeform search query indicates an update of data in the flat data.

8. A method comprising:
   performing a search for results relevant to one or more tokens, the one or more tokens identified from a freeform search query, using a first search process, the first search process using a graph structure and flat data corresponding to the graph structure to rank search results according to a first ranking order, the search additionally populating a why found table indicating one or more reasons why each search result was found;
   joining pieces of information corresponding to the results relevant to the identified one or more tokens using the why found table, forming a view;
   identifying one or more operators in the freeform search query;
   locating one or more patterns of operators and terms, in a pattern database, matching the one or more operators and one or more surrounding terms in the freeform search query; and
   based on the located one or more patterns and the view, creating a command corresponding to the freeform search query.

9. The method of claim 8, wherein the first search process includes:
   removing stop words from the one or more search terms;
   for each of the one or more search terms, searching the pieces of information from the flat data to locate one or more matching pieces of information from the flat data, wherein a piece of data from the flat data matches if it contains at least one attribute with a value that is similar to the search term;
   for each matching piece of data from the flat data:
   calculating a fuzzy match score, wherein the fuzzy match score indicates how similar the at least one attribute in the matching piece of data is to the corresponding search term; and
   calculating a match frequency score, wherein the match frequency score indicates how many attributes in the matching piece of data are similar to the corresponding search term;
   for each node in the graph structure, calculating a ranking score based on a combination of the fuzzy match score and the match frequency score for a corresponding piece of data from the flat data, if such a fuzzy match score and match frequency score exist for the corresponding piece of data from the flat data, as well as based on combinations of fuzzy match scores and match frequency scores for all matching pieces of information in the flat data, weighted based on distance along a shortest possible path between the node and a node corresponding to the corresponding matching piece of data in the flat data; and
   returning one or more search results based on the ranking scores of nodes corresponding to pieces of information for the one or more search results.

10. The method of claim 8, wherein the identifying one or more operators in the freeform search query includes comparing the one or more search terms to an operator database.

11. The method of claim 8, further comprising eliminating all but a preset number of search results from the one or more search results.

12. The method of claim 8, further comprising issuing the command to a relational database.

13. The method of claim 8, wherein the freeform search query indicates a deletion of data from the flat data.

14. The method of claim 8, wherein the freeform search query indicates an update of data in the flat data.

15. A non-transitory machine-readable storage medium comprising instructions that, when implemented by one or more machines, cause the one or more machines to perform operations comprising:
  performing a search for results relevant to one or more tokens, the one or more tokens identified from a freeform search query, using a first search process, the first search process using a graph structure and flat data corresponding to the graph structure to rank search results according to a first ranking order, the search additionally populating a why found table indicating one or more reasons why each search result was found;
  joining pieces of information corresponding to the results relevant to the identified one or more tokens using the why found table, forming a view;
  identifying one or more operators in the freeform search query;
  locating one or more patterns of operators and terms, in a pattern database, matching the one or more operators and one or more surrounding terms in the freeform search query; and
  based on the located one or more patterns and the view, creating a command corresponding to the freeform search query.

16. The non-transitory machine-readable storage medium of claim 15, wherein the first search process includes:
  removing stop words from the one or more search terms;
  for each of the one or more search terms, searching the pieces of information from the flat data to locate one or more matching pieces of information from the flat data, wherein a piece of data from the flat data matches if it contains at least one attribute with a value that is similar to the search term;
  for each matching piece of data from the flat data:
    calculating a fuzzy match score, wherein the fuzzy match score indicates how similar the at least one attribute in the matching piece of data is to the corresponding search term; and
    calculating a match frequency score, wherein the match frequency score indicates how many attributes in the matching piece of data are similar to the corresponding search term;
  for each node in the graph structure, calculating a ranking score based on a combination of the fuzzy match score and the match frequency score for a corresponding piece of data from the flat data, if such a fuzzy match score and match frequency score exist for the corresponding piece of data from the flat data, as well as based on combinations of fuzzy match scores and match frequency scores for all matching pieces of information in the flat data, weighted based on distance along a shortest possible path between the node and a node corresponding to the corresponding matching piece of data in the flat data; and
  returning one or more search results based on the ranking scores of nodes corresponding to pieces of information for the one or more search results.

17. The non-transitory machine-readable storage medium of claim 15, wherein the identifying one or more operators in the freeform search query includes comparing the one or more search terms to an operator database.

18. The non-transitory machine-readable storage medium of claim 15, wherein the operations further comprise eliminating all but a preset number of search results from the one or more search results.

19. The non-transitory machine-readable storage medium of claim 15, wherein the operations further comprise issuing the command to a relational database.

20. The non-transitory machine-readable storage medium of claim 15, wherein the freeform search query indicates a deletion of data from the flat data.

* * * * *